Jan. 20, 1970  R. W. JOHNSON  3,490,096
APPARATUS FOR PRODUCING TILE PANELS
Original Filed Sept. 29, 1964  6 Sheets-Sheet 1
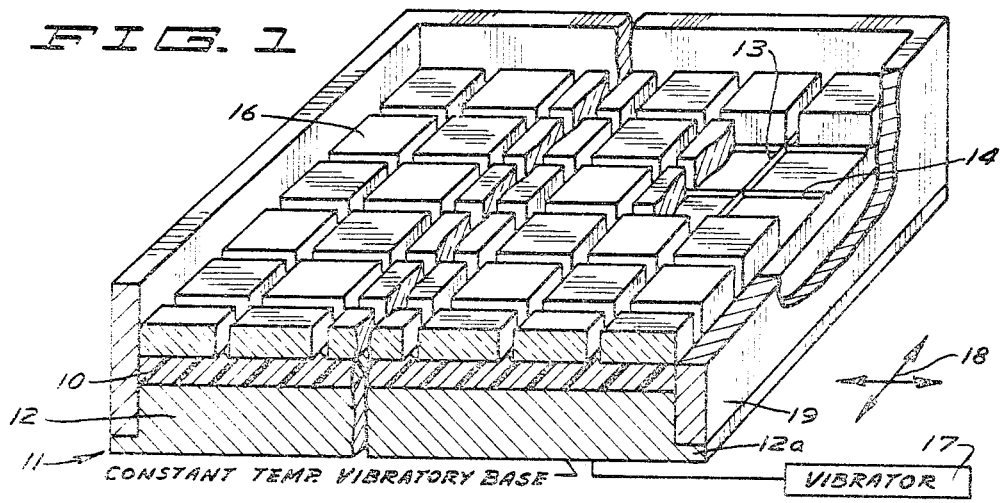
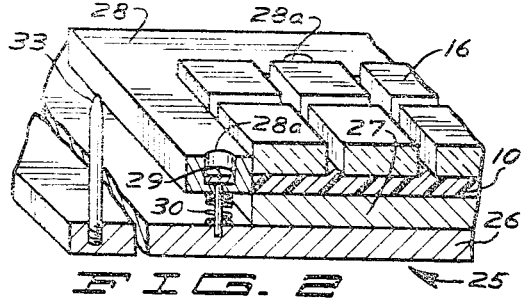
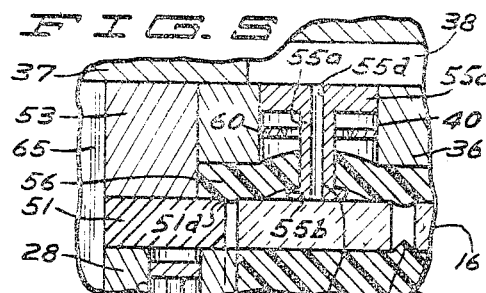
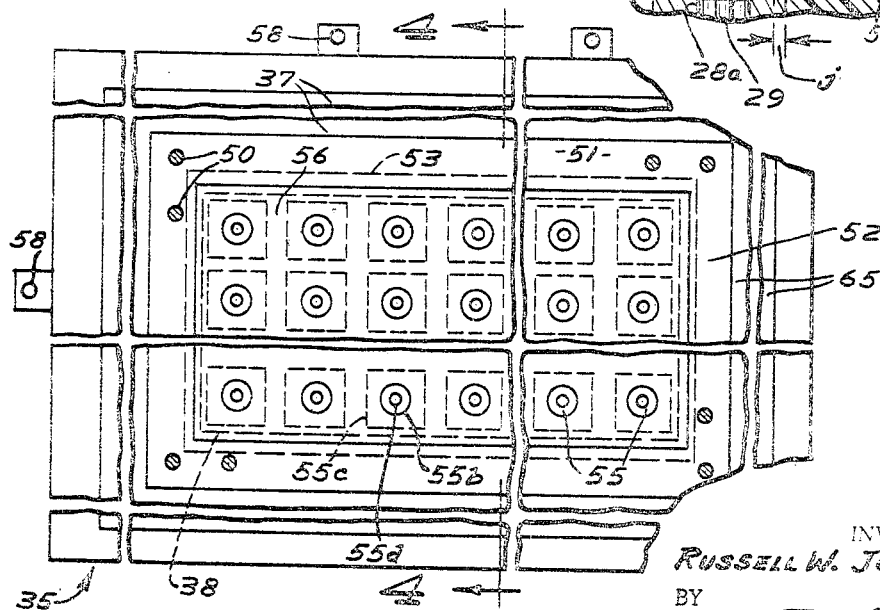
INVENTOR.
RUSSELL W. JOHNSON
BY
*Duffy, Peterson, Johnson & Westman*
ATTORNEYS

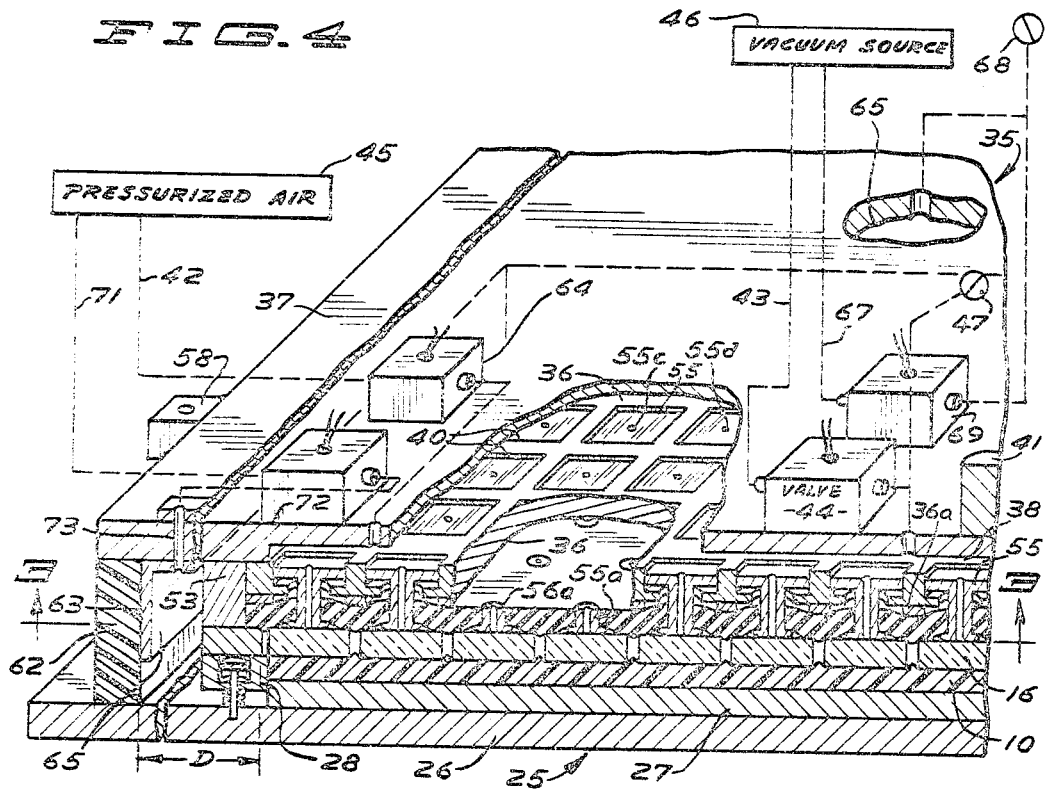

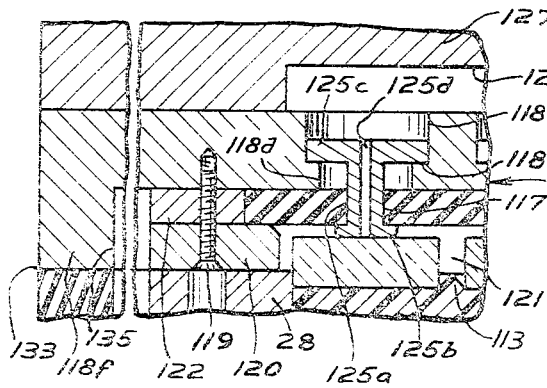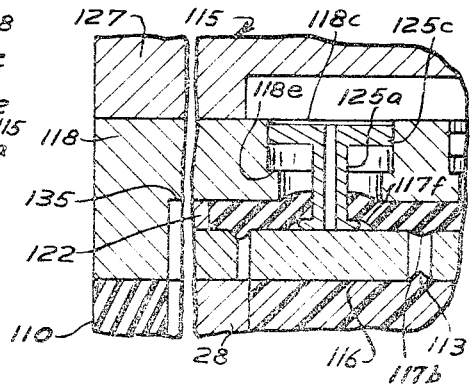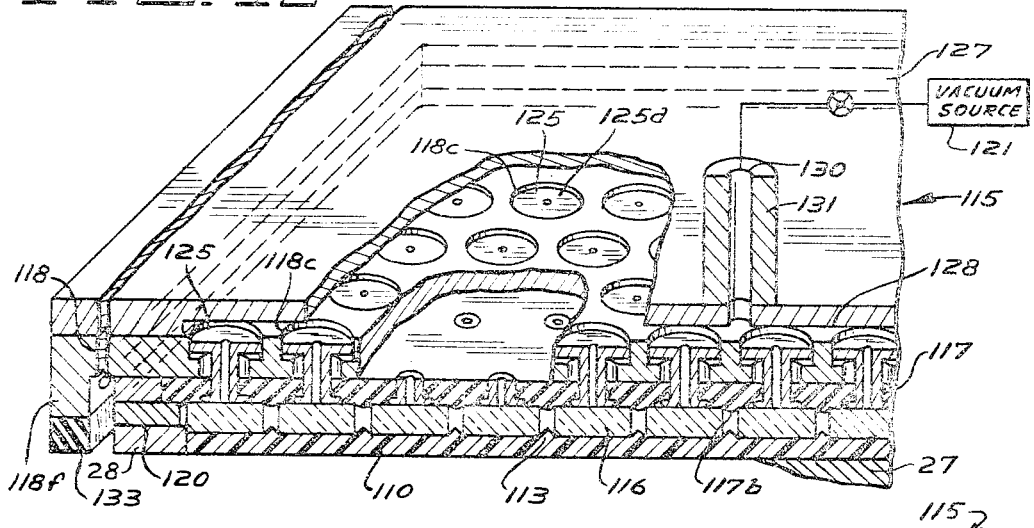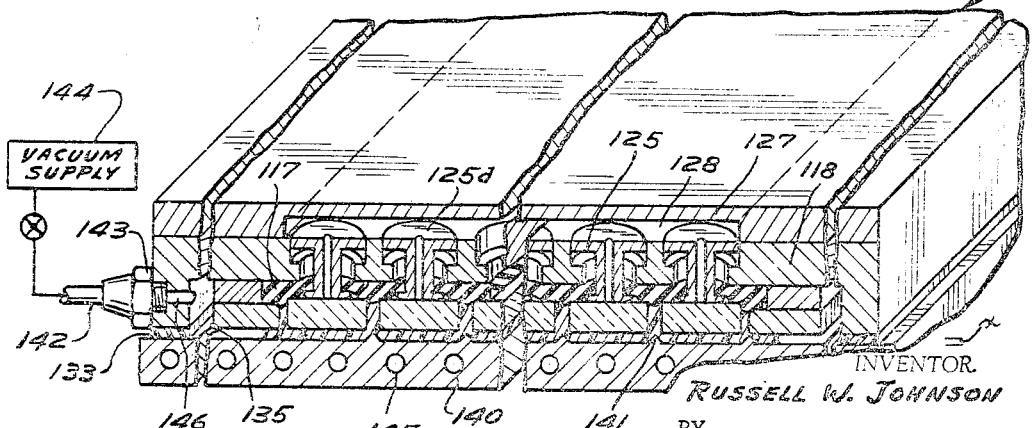

Jan. 20, 1970     R. W. JOHNSON     3,490,096
APPARATUS FOR PRODUCING TILE PANELS
Original Filed Sept. 29, 1964     6 Sheets-Sheet 4
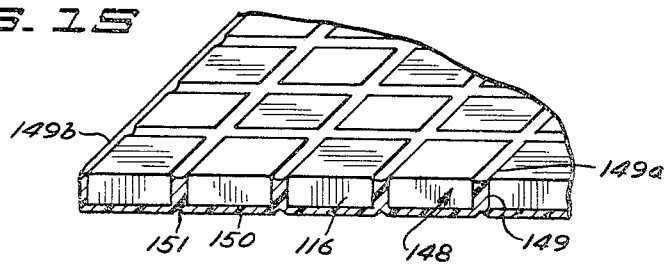
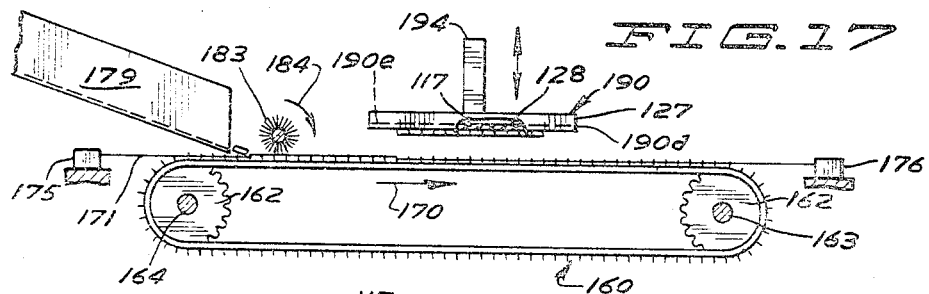
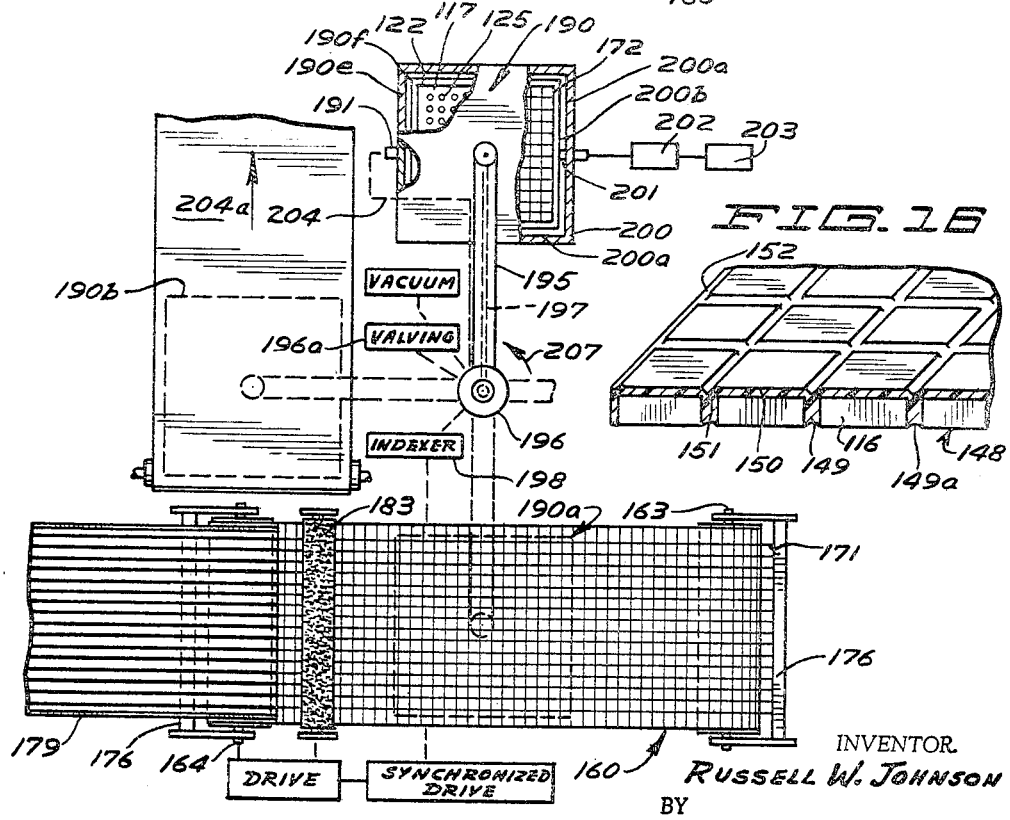
INVENTOR.
RUSSELL W. JOHNSON
BY
ATTORNEYS

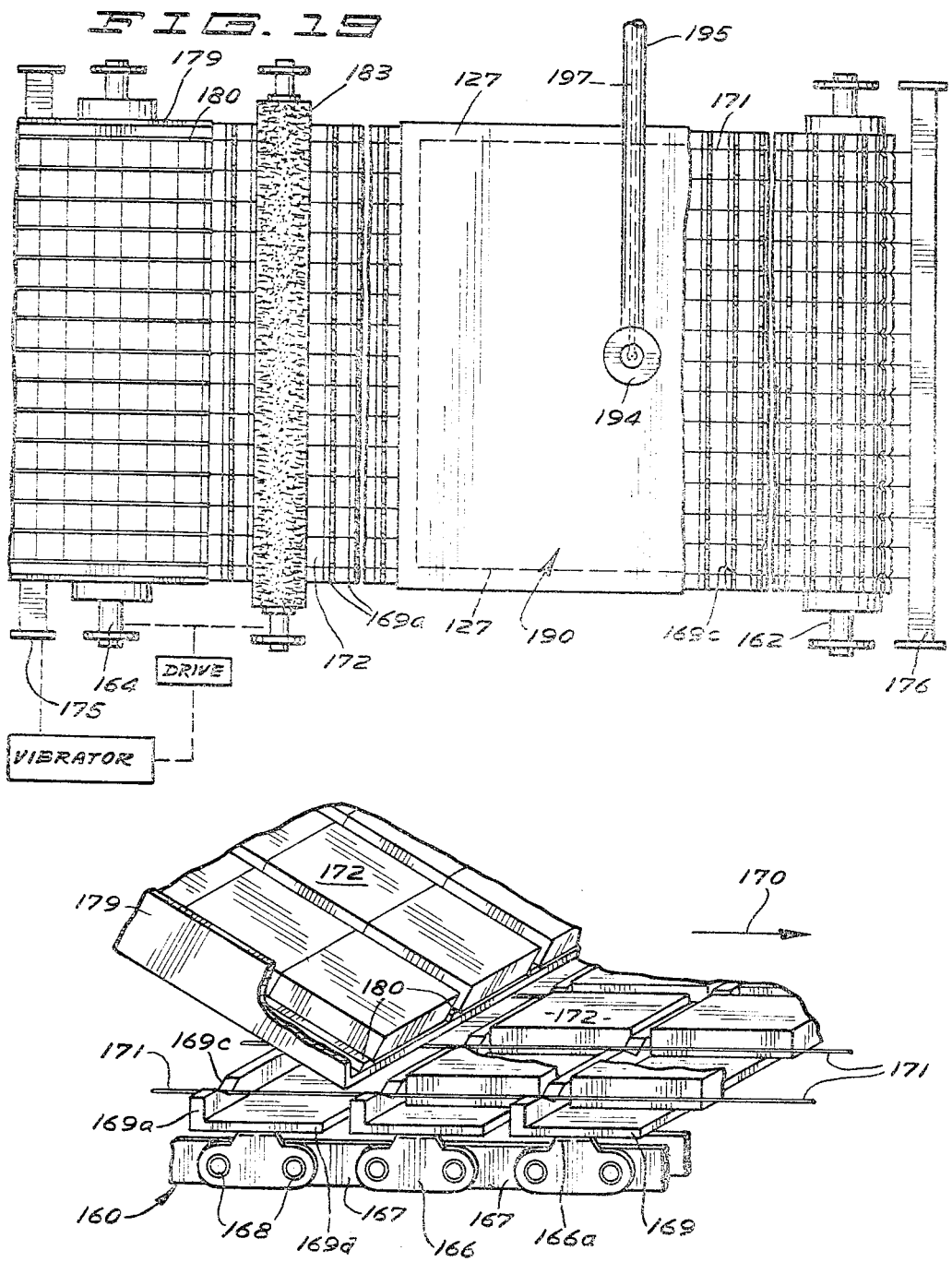

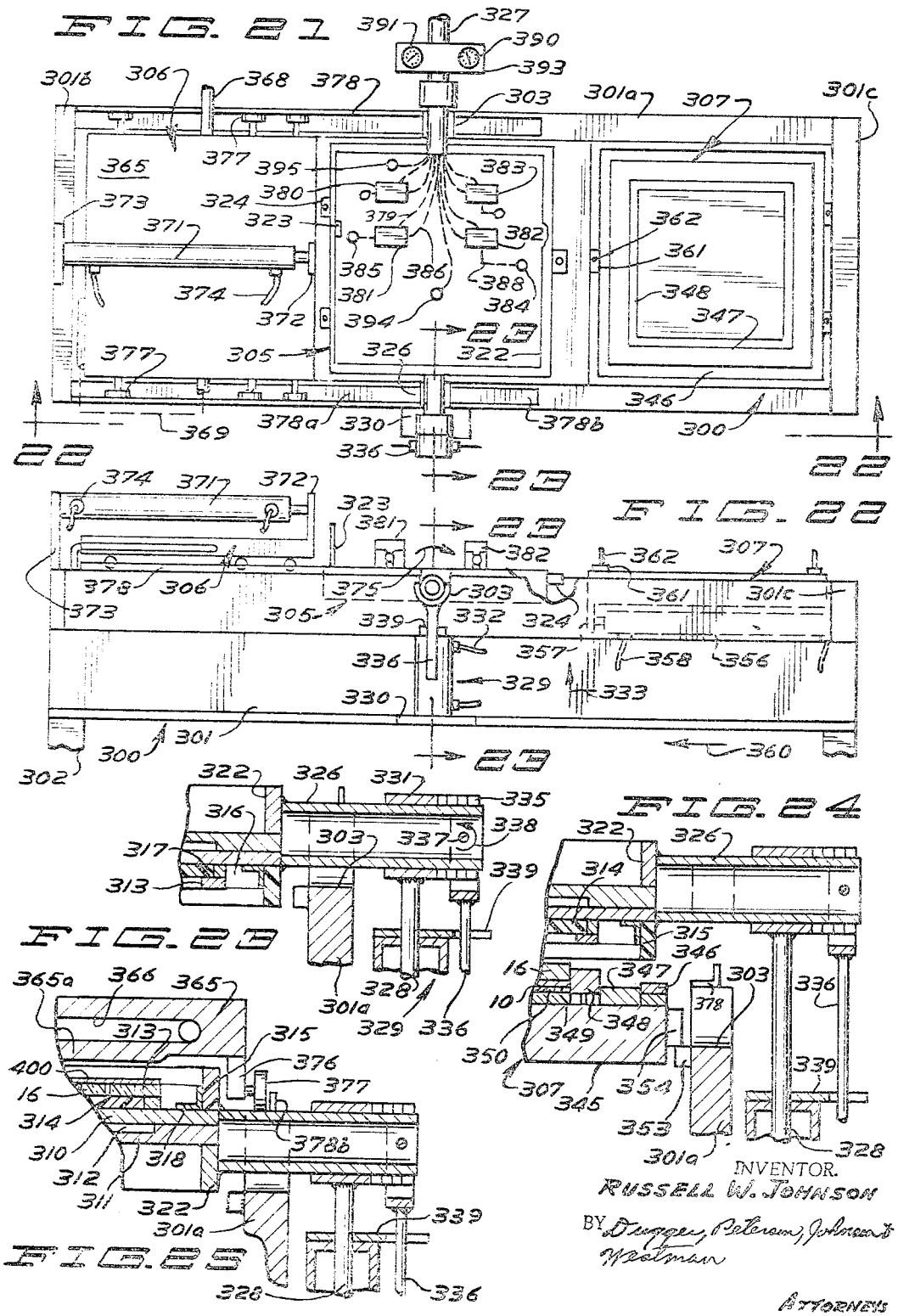

United States Patent Office 3,490,096
Patented Jan. 20, 1970

1

3,490,096
APPARATUS FOR PRODUCING TILE PANELS
Russell W. Johnson, Hutchinson, Minn., assignor of fifty percent to Clarence R. Enright, St. Cloud, Minn.
Original application Sept. 29, 1964, Ser. No. 400,149, now Patent No. 3,359,354, dated Dec. 19, 1967. Divided and this application Dec. 1, 1967, Ser. No. 739,979
Int. Cl. B29c 1/14
U.S. Cl. 18—5    35 Claims

ABSTRACT OF THE DISCLOSURE

Apparatus for producing finished tile panels made up of spaced tile pieces and a cured resin mixture binding said pieces that in one embodiment includes a tile mounting platform having a resiliently mounted alignment frame, a vacuum manifold for picking up aligned tile pieces and a support member whereby applying a vacuum, the resin mixture is drawn into the space between the tile pieces, the support member and manifold. In another embodiment there is chain conveyor mechanism for aligning tile pieces and a vacuum manifold that is indexed through various steps during the panel making operation. In another embodiment the manifold is moved to pick up tile pieces, then retracted and rotated, and thereafter a heated platen advanced to be above the manifold where the resin mixture is drawn between the tile pieces.

---

This is a division of application Ser. No. 400,149, filed Sept. 29, 1964.

This invention relates to a new and novel apparatus for forming rigid or semi-rigid finished tile panels that in part are made up of a plurality of individual pieces of ceramic tile.

An additional object of this invention is to provide new and novel pneumatic apparatus utilizable in producing finished tile panels. Another object of this invention is to provide new and novel manifold apparatus for use in producing preformed tile panels.

The invention is illustrated by reference to the drawings in which corresponding numerals refer to the same part and in which:

FIGURE 1 is a vertical cross-section of the tile mounting board and the tile arraying frame with individual ceramic tile pieces and said frame shown in perspective, portions of said view being broken away;

FIGURE 2 is a fragmentary vertical corss-sectional view shown in perspective of one corner portion of the tile aligning platform, and the tile mounting board with tile pieces arrayed thereon, a portion of said platform being broken away;

FIGURE 3 is a bottom view of the manifold assembly of this invention generally taken along the line and in the direction of the arrows 3—3 of FIGURE 4, longitudinal and transverse portions of said assembly being broken away;

FIGURE 4 is a fragmentary vertical cross-sectional view of the structure of FIGURE 2 and the vacuum manifold assembly illustrating the manifold assembly just as it has been sufficiently lowered to place the resilient pad in fluid sealing relationship with the tile pieces, the view of the manifold assembly being broken away in part, and in cross-section generally taken along the line and in the direction of the arrows 4—4 of FIGURE 3. Also illustrated in schematic are pneumatic circuitry and components that are connected to said assembly;

FIGURE 5 is an enlarged fragmentary cross-sectional view of a portion of the structure of FIGURE 4 other than it illustrates the relative positions of portions of said

2 structure after full application of vacuum has been applied to the manifold chamber;

FIGURE 6 is a plan of the heat transfer support member with the resin mixture pattern board thereon and resin mixture filling the pattern;

FIGURE 7 is an enlarged, fragmentary, vertical cross-sectional view generally taken along the line and in the direction of the arrows 7—7 of FIGURE 6;

FIGURE 8 is a fragmentary vertical cross sectional view of the support member of FIGURE 6 after the manifold assembly has been fully lowered and the resinous material has been drawn into the voids between the tile pieces.

FIGURE 9 is an enlarged fragmentary vertical view generally taken along the line in the direction of the arrows 9—9 of FIGURE 8 to illustrate the lands of manifold assembly side rails in abutting relation with the heat transfer support member;

FIGURE 10 is a fragmentary cross-sectional view in perspective of a finished tile panel made with the apparatus of FIGURES 1–9;

FIGURE 11 is an enlarged fragmentary, vertical cross-sectional view of a second embodiment of a vacuum manifold assembly and a tile mounting board showing the manifold assembly just as it has been sufficiently lowered to place a manifold spool in abutting relationship with a tile piece;

FIGURE 12 is a fragmentary vertical cross-sectional view, part in perspective, of the structure of FIGURE 11 just after the manifold assembly has been fully lowered to illustrate the title pieces and manifold spools before a vacuum is applied to the manifold chamber, portions of said manifold assembly being broken away;

FIGURE 13 is an enlarged fragmentary cross-sectional view corresponding to FIGURE 11 other than it is taken of the structure in the FIGURE 12 position after full vacuum has been applied to the manifold chamber;

FIGURE 14 is a fragmentary cross-sectional view taken somewhat in perspective to illustrate the picked up tile pieces of FIGURE 13 positioned above the heat transfer support member and after the resinous material has been drawn into the voids between the tile pieces;

FIGURE 15 is a fragmentary perspective view of the finished panel made by the method and apparatus of FIGURES 11–14 showing the finished surface thereof;

FIGURE 16 is a view similar to FIGURE 15 other than it illustrates the gridded back surface of the finished panel of FIGURE 15;

FIGURE 17 is a diagrammatic vertical view of a part of a continuous process for forming the finished tile panels of this invention;

FIGURE 18 is a diagrammatic plan view of the structure for carrying said continuous process including the structure illustrated in FIGURE 17; portions of the vacuum manifold assembly being broken away to illustrate the structure therebeneath and other positions of the manifold assembly being illustrated in dotted lines.

FIGURE 19 is an enlarged fragmentary plan view of the mechanism for continuously aligning individual tile pieces in accordance with the process of FIGURES 17 and 18, portions of said view being broken away;

FIGURE 20 is a fragmentary enlarged perspective view of one corner portion of the chute and the continuous belt of FIGURE 19 for aligning tile, portions of the tile pieces being broken away to more clearly illustrate the invention;

FIGURE 21 is a plan view, portions being diagrammatic, of a further embodiment of apparatus for making finished tile panels of this invention, said view showing the assemblies thereof in a datum condition;

FIGURE 22 is a side elevational view of the apparatus of FIGURE 21, said view being generally taken along the line and in the direction of the arrows 22—22 of FIGURE 21;

FIGURE 23 is an enlarged fragmentary cross sectional view generally taken along the line and in the direction of the arrows 23—23 of FIGURES 21 and 22 to illustrate the structure mounting the manifold assembly for rotational and vertical transitory movement, said view showing the manifold assembly in a lowered datum condition;

FIGURE 24 is a view similar to FIGURE 23 other than it illustrates the manifold assembly in an elevated condition and the alignment assembly translated to beneath the manifold assembly prior to the lowering of the manifold assembly to pick up tile pieces; and FIGURE 25 is a view similar to FIGURE 23 other than the manifold assembly has been rotated 180° about a horizontal axis and the steam heated platen has been horizontally moved to a position directly above said manifold assembly.

Referring to FIGURE 1 there is illustrated a gridded tile mounting board 10 positioned on the constant temperature vibratory frame mechanism, generally designated 11. The tile mounting board has a generally planar surface other than for the integrally formed upwardly extending parallel longitudinal grids 13 and parallel transversely extending grids 14 that intersect grids 13. The grids 13 and 14 are of a size and shape to retain the individual tile pieces 16 in the ultimate desired spaced relationship of a preformed tile panel of this invention. Preferably the mounting board 10 is made of a poly-ester polyurethane resinous material, such as Du Pont's Adiprenen, that has been treated to be slippery by the addition of molydenum compounds.

In order to facilitate arraying the tile piece 16 on the tile mounting board, the tile mounting board, the tile mounting board is positioned on the vibratory frame mechanism 11. The mechanism 11 includes a constant temperature vibratory base 12 that is vibrated in a horizontal plane by a vibrator 17. The vibrator imparts vibratory components of motion in both longitudinal and transverse horizontal directions as indicated by the double arrows 18.

The base 12 has a perimetric shoulder 12a that mounts an upwardly extending open rectangular frame 19 that extends above the base a distance substantially greater than the thickness of the tile piece plus the thickness of the tile mounting board 10. The central opening of the frame 19 is of a size and shape to form a close fit with the board 10, it being noted that there are no grids 13 and 14 formed at the perimetric edges of the board 10.

After the tile pieces have been arrayed by the structure of FIGURE 1 as will be more fully explained hereinafter, the tile mounting board 10 with the tile pieces thereon is removed from the vibratory mechanism 11 and positioned on the aligning platform which is generally designated 25 and in part illustrated in FIGURE 2. The platform 25 includes a mounting plate 26 that has attached to the upper surfaces thereof a constant temperature base 27. The base 27 in horizontal cross section is of the same size and shape as the tile mounting board, but is less than one-half the area of the mounting plate 26.

Mounted on the mounting plate 26 to be vertically spaced thereabove and to surround a tile mounting board positioned on the base 27 is an open rectangular aligning frame 28 having a central opening of a size and shape so that the inner vertical edges of said frame form a close fit with the virtial edges of the tile mounting board. The aligning frame is provided with a plurality of vertical bores 28a, the upper portion of said bores being enlarged to receive the cap portion of cap bolts 29. The reduced diameter portion of the cap bolts are extended downwarly through reduced diameter portions of bores 28a and threaded into the mounting plate 26. The cap bolts having shoulders (not shown) to abut against plate 26 and thereby form stops to limit the threading into plate 26. Around the reduced diameter portion of each bolt 29 there is provided a coil spring 30 which at the upper end abuts against the lower surface of frame 28 and at the lower end abuts against mounting plate 26 to resiliently urge the aligning frame upwardly against the shoulders formed by the enlarged diametric portions and reduced diametric portions of bores 28a. The aligning frame in its uppermost position extends to an elevation substantially above the lower horizontal surfaces of tile pieces 16 on the tile board 10 when said board is on the constant temperature base 27; while the lower surface of frame 28 extends to slightly lower elevation than the top of base 27. The spacing of the frame 28 above the mounting plate in the datum position illustrated in FIGURE 2 is sufficient so that the aligning frame can be forced downwardly against the action of the spring 30 to a position that the upper horizontal surfaces of the frame 28 is about even with or below the level of the general planar surface portions of the board 10 (see FIGURE 5). Also the diameters of the bore portions and the cap bolts are such that very close fits are formed whereby the frame 28 is retained in a horizontal condition to properly horizontally position the board 10.

In order to pick up the individual tile pieces and positively retain them in the same spaced relationship as when they are on the aligning platform, there is provided a vacuum manifold assembly generally designated 36 (see FIGURES 3, 4 and 5). The manifold assembly includes a manifold plate 36 that in horizontal cross section is about the same size and shape or larger than the tile mounting board. The manifold plate is bolted or otherwise appropriately secured in the manifold body 37 to be in depending relation thereto and in fluid sealing engagement therewith (for example by a gasket), the manifold body in horizontal cross-sectional being substantially larger than the manifold plate. The manifold body includes a manifold chamber 38 that opens to each of the plurality of bores 40 formed in the manifold plate (see FIGURE 4). An upright boss 41 is secured to the top central portion of the manifold body 37 and may have a fluid passageway 42 therein that opens into the manifold chamber through an appropriate aperture, formed in the manifold body. However as illustrated in FIGURE 4, mostly schematically, a solenoid operated vacuum control valve 44 is mounted on the manifold in a flexible fluid line 43 which at one end opens through an aperture into the manifold chamber 38. A vacuum gauge 47 is connected in line 43 to at all times indicate the pressure in the manifold chamber. A second flexible fluid line 42 is at one end connected to a source of pressurized air 45 and at the opposite end opens through an aperture to the manifold chamber, there being provided a solenoid operated control valve 64 connected in line 42 to control the application of pressurized air to said chamber.

Bolted to the underside of the manifold body in depending relation thereto and in abutting engagement with the manifold plate by bolts 50 are a pair of parallel side rails 51 and parallel end rails 52; there being provided a metal spacer 53 intermediate each of the metal rails 51 and 52, and the manifold body respectively. As may be noted from FIGURE 3, the spacers 53 and the rails 51, 52 enclosed rectangular openings. The cross-sectional area of the opening enclosed by the spacers is of a larger cross-sectional area than that enclosed by rails. The rails 51, 52 respectively are mounted to have their inner vertical edges horizontally spaced from adjacent vertical faces of the outermost rows of tile pieces and the tile mounting board 10 a distance approximately one half of that between adjacent pair of tile pieces on the tile mounting board when the manifold assembly 35 is lowered to pick up the tile pieces from the aligning platform 25. In order to insure the aforementioned spacing between the rails 51, 52 and the said vertical faces of the tile pieces, a plurality of upright guide pins 33 are mounted on the mounting plate 26, the upper ends of the guide pins being tapered. A plurality of spaced apertured guide lugs 58 are joined to the outer vertical edges of the manifold body such that the apertures of said lugs are in the same spaced relationship as the guide pins on the mounting plate. As the manifold body is lowered, the non-tapered portions of the guide pins are extended into the guide lug apertures to correctly horizontally position the manifold body relative to the aligning platform, the relative positioning being such that as the rails 51, 52 force the aligning frame 28 downwardly against the resilient action of the coil springs 30 and the inner vertical faces of said rails are spaced from the outer vertical surfaces of the tile pieces by substantially one half the width of a joint space (provided the outermost rows of the tile pieces have previously arrayed to be in abutting engagement with the alignment frame in the FIGURE 2 position). This spacing between the rails 50, 51 and the outermost rows of tile pieces is indicated by dimension j in FIGURE 5.

Mounted on the manifold plate 36 in abutting engagement with the under surface thereof by a plurality of manifold spools 55 is a pad 56 made of resilient material. Preferably the pad is a solid sheet of silicone, however, a silicone sponge type pad can also be used. Additionally it is to be understood that other types of resilient material such as neoprene may be used if coated with silicone tape or suitable material that readily releases the individual pieces of the tile and readily releases the subsequently used resinous material. Preferably the resilient pad is a resiliency of Air-Space Material Specification 3195 or if desired more resilient material such as Air-Space Material Specification 190 may be used. An advantage of using a silicone solid sheet pad or silicone sponge is that it does not adhere and will last longer than a silicone sponge. It is important that the resilient pad 56 will deflect in a manner set forth hereinafter and readily release from the materials used in forming the finished tile panel. Also it preferably has to withstand compression without taking a compression set within economic limits and has to withstand high temperatures.

The resilient pad is of a size and shape to generally fill the rectangular opening enclosed by the spacers 53, to overlay portions of rails 51, 52; and of a height approximately equal to the distance between the upper surfaces of the rails 51, 52 and the bottom planar surface of the manifold plate (see FIGURE 5). Also the resilient pad is provided with a plurality of properly spaced perforations 56a, the perforations being spaced such that when the pad is positioned above the aligned tile pieces on the tile mounting board, each perforation 56a opens directly above a central horizontal portion of the upper surface of a tile piece 16. Each of the perforations is located to open to the adjacent rectangular bore 40 formed in the manifold plate. Provided in each bore 40 intermediate opposite axial ends thereof is an annular retainer 60 that has a substantially smaller inside diameter than the cross-sectional dimensions of the bore. The annular retainer may be a steel pronged washer retained in a fixed axial position in the bore, or the retainer 60 may be provided by making the manifold plate of a plurality of horizontal laminated layers of metal wherein the bores through the layers of metal provides a bore that in vertical cross-section is of the shape illustrated in FIGURE 8 other than that the retainer will be integrally formed with one of the intermediate layers of metal.

A manifold spool 55 is mounted in each of the manifold plate bores and has a reduced diameter portion 55a extended through the retainer aperture and the adjacent resilient pad perforation 56a. Integrally formed with the reduced diameter portion 55a is a lower spool flange 55b. Preferably the spool flange 55b is circular in horizontal cross section and of a size and shape substantially larger than the pad perforation and the retainer aperture, but of a substantially smaller size and shape than that of the manifold bore. Integrally joined to the opposite end of the reduced diameter portion 55a is an enlarged upper, rectangular spool flange 55c, the size and shape of spool flange 55c being such that its outer perimetric surfaces form a close sliding fit with the peripheral wall of the upper part of the manifold bore. When the manifold plate is located a substantial distance above the tile pieces, the manifold spool in its lowermost position will have the upper flange 55c abutting against retainer 60 to preclude further lowering of the manifold spool relative to the manifold plate; while at the same time, the upper horizontal surface of the lower flange 55b abuts against the lower surface of the resilient pad to hold the upper surface of the resilient pad in abutting relationship with the lower surfaces of the manifold plate. Each manifold spool includes a central vertical aperture 55d that at its upper end opens through the lower surface of the manifold spool flange 55b and at the opposite end opens through the upper surface of the manifold spool flange 55c. An example, each aperture 55d may be 0.3 inch in diameter.

The manifod assembly is provided with a peripheral seal 62 that is attached to the manifold body to at its upper edge form a fluid sealing engagement with the lower surface perimetric edge portions of said body. The seal 62 is made of a closed cell sponge material of sufficient strength to be self sustaining. The height of the sponge material in a non-compressed condition is such that the seal extends to an elevation to abut against the mounting plate 26 when the manifold assembly has been lowered sufficiently that the spools just initially contact the tile pieces on the aligning platform. The inner surface of the seal 63 is preferably horizontally spaced from the corresponding inner surface of the adjacent rail 51 or 52 by a dimension D. Preferably the dimension D is sufficiently great so that the area of the entire perimetric channel (having a dimension D at right angles to the tile mounting board) is equal to or greater than twice the area bounded by the outermost edges of the outermost rows tile pieces on the tile mounting board (i.e. that of the tile mounting board 10). A right angle perimetric metal flange 63 has a horizontal leg secured to the manifold plate and a vertical leg in abutting relation with the seal 62. The vertical leg is of a vertical dimension that is slightly less than the distance between the lower edge of the rails 51 and 52 respectively to the under surface of the manifold body.

The inner vertical surfaces of the vertical flange leg and seal member 62 respectively together with adjacent vertical surfaces of the spacers 53, rails 51 and 52 respectively, and the horizontal surface of the manifold body intermediate the vertical leg of member 63 and spacers 53, in vertical cross-section form a generally U-shaped perimetric channel 65 that extends completely around the tile pieces and is located outwardly therefrom. The purpose of providing this channel will become more apparent hereinafter.

The manifold assembly is provided with a bore that at one end opens into the interior of the channel 65 and at the other end opens to one end of a flexible fluid line 67, the opposite end of line 67 being connected to vacuum source 46. A solenoid operated control valve 69 is connected in line 67 to control the application of vacuum to said channel. A vacuum gauge 68 is connected in line 67 to all times indicate the pressure therein. Another flexible fluid line 71 at one end opens to the source of pressurized air 45 and at the opposite end to a bore 73 that opens to channel 65, there being provided a solenoid operated control valve 72 in line 71 to control the application of pressurized air to channel 65.

There is also provided a heat transfer support member 75 having a planar top surface that readily releases from the subsequently applied resinous mixture. Secured to the heat transfer member are a plurality of upwardly extending guide pins 76 that are located in the same horizontal spaced relationship as guide pins 33 of the aligning platform.

The support members 75 has a plurality of tubular passageways 77 located beneath the upper horizontal surface thereof for selectively heating and cooling the top surface of said support member. Thus when it is desired to apply heat through support member 75, steam is passed through said passageways; while when it is to be cooled, cool water is passed through said passageways.

In order to apply resin to the upper surface of the support member in the desired pattern, there is provided a pattern board 80 having a plurality of apertured guide lugs 81 to cooperate with the guide pins 76 to properly horizontally position the pattern board on the support member 75. The pattern board has a cut out 82 which advantageously may be shaped as illustrated in FIGURE 7. The size and shape of the cut out 81 is such that when the board 80 is positioned on the support member the cut out portion will retain a predetermined quantity of uncured resinous material 84 that is to be used in forming the finished tile panel.

The structure of the first embodiment of the invention having been described, the method of using such structure to form a preformed tile panel will now be set forth. Initially the tile mounting board 10 is positioned on the vibratory base 12 with the grids facing up. Next a weighted quantity of tile pieces are dumped onto the board within the confines of the frame 19. As the board 10 is vibrated in a horizontal direction (both longitudinal and transverse vibrations in horizontal plane) the majority of tile pieces are arrayed to lay flat against the planar surface portions of the board such as illustrated in FIGURE 1. The remaining portion, (roughly in the neighborhood of 3%) are rapidly wiped into position by hand. After all the tile pieces have been arrayed on the tile mounting board, the board is removed from the base 12 (for example by a plunger extending upwardly through the base, not shown, or by first removing frame 19); and then the board with arrayed tile pieces thereon are seated upon the base 27 of the aligning platform 25. At this time the coil springs 30 retain the aligning frame 28 such that the upper surface of said frame is at a higher elevation than the lower portions of the tile pieces. Due to slight variations in the dimension of the tiles (within the desired tolerances) the outer vertical surfaces of some of the tile pieces in the outermost rows of tile pieces will be spaced from the inner surfaces of adjacent frame member of frame 28. Accordingly with rapid sweeping motions of the operators hand all the tile pieces in the outermost rows are swept to abut against the adjacent vertical surfaces of the aligning frame. In this connection it is to be noted that both base 12 and base 27 are retained at the same constant temperature (by conventional mechanism—not shown) to substantially eliminate any undesired alignment of tile pieces due to temperature variations of the mounting board 10.

After the tile pieces have been aligned through the use of alignment platform, the manifold assembly is lowered through suitable conventional mechanism (not shown), for example, a pulley assembly that at one end is connected to suitable supporting structure and at the other end to the boss 41 of the manifold assembly. Due to the provision of the guide pins 33 and the lugs 58 the manifold assembly will be properly horizontally positioned relative to the tile pieces on the mounting platform such that each of the manifold spools 55 will be centrally located in a predetermined position relative to the upper surface of the respective tile piece that it abuttingly engages. At about the time the manifold assembly has been lowered so that the manifold spools initially contact the upper surfaces of the tile pieces, seal 62 forms a fluid sealing engagement with the mounting plate 26. Now valve 69 is turned so that vacuum source 46 is connected to the channel 65, valve 44 being closed. Initial application of vacuum through valve 69 to the channel 65 results in the air pressure acting on the upper surface of the manifold assembly forcing said assembly to move in a downward direction and thereby the seal 62 being compressed. The vacuum applied to channel 65 is also applied to manifold chamber 38 through the slotted portions 86 of the rail 51, 52 (see slots in FIGURE 8), the joint spaces between the tile pieces, thence over the top surfaces of the tile pieces and through the apertures 55d of the manifold spools to the manifold chamber. Thus the gauge pressures indicated by gauges 47 and 68 during the initial withdrawal of air from channel 65 are approximately the same. However when the vacuum has drawn the manifold assembly downwardly sufficiently relative to the mounting plate 26, the tile pieces force the manifold spools upwardly to space the upper flanges 55c above the retainers 60; and subsequently bring the tile pieces into fluid sealing engagement with the resilient pad 56 (for example at about minus 5–6 in. of Hg).

At the time all the top tile pieces are in fluid sealing engagement with the resilient pad, the pressure in the manifold chamber no longer drops and this is reflected by the gauge pressure of gauge 68 continuing to drop while the gauge pressure of gauge 47 stays substantially the same. At this time the manifold assembly, the aligning platform 25, and the tile pieces are in relative positions similar to that illustrated in FIGURE 5; the resilient pad being somewhat extruded down into the joint spaces between the tile pieces and the rails 51, 52 having forced the alignment frame downwardly so that the upper surface is substantially level with the upper planar surface portions of the tile mounting board (FIGURE 4).

Now the valve 69 is operated so that there is no fluid communication through line 67 to the ambient atmosphere or between source 46 and channel 65; the valve 44 is operated so that line 43 place the vacuum source in fluid communication with chamber 38. Additional air is withdrawn from the manifold chamber, plate 36 is lowered and the seal 62 is further compressed. This results in the resilient pad portions being deflected upwardly into the manifold plate bores 40 from the manifold spools (and pad material adjacent the spool bores) since the tile pieces and manifold spools remain stationery and plate 36 moves downwardly to compress the pad more than it had been previously compressed. After the pressure has sufficiently dropped in the manifold chamber to accomplish the foregoing (for example to 20 in. of mercury), then valve 72 is operated to permit the application of pressurized air from source 45 through line 71 to channel 65. The application of pressurized air to channel 65 results in the manifold assembly with the tile pieces thereon being elevated since channel 65 is returned to atmospheric pressure. Then valve 72 is again operated to a closed condition.

At about the same time the tile pieces are being affixed to the manifold assembly as described above, the pattern board 80 is arrayed on the upper surface of the heat transfer support member with the pins 76 extended through the guide lugs 81. Now a predetermined quantity of uncured resinous mixture is deposited in the cut out 82. The resin mixture is preferably a polyether polyurethene type resin although other type resins can be used. Further the resin mixture is of a viscosity so that it does not readily flow upon removal of the pattern board 80 from the heat transfer support member.

After the pattern board has been removed, the manifold assembly 35 is mechanically lowered onto the support member 75 such that the guide lugs 58 engage the guide pins 76 to properly align the manifold assembly with reference to the heat transfer support member. After the seal 62 has initially engaged the support member, the manifold assembly is no longer mechanically supported; however, the lands 51a of rails 51, 52 are slightly spaced above the top surface of support member 75. At this time vacuum is applied through line 67 to channel 65 by operating valve 69 to an open condition, the tile pieces at this time either abutting against the resin mixture 84 or just about to abut against said resin mixture. This application of vacuum withdraws air from the channel 65 and due to the spacing of the rails 51, 52 and the slots 86 provided therein between lands 51a, also applied vacuum in the voids between the tile pieces and the voids between the under surfaces of the tile pieces and the support member 75. This application of vacuum to the channel 65 draws the manifold assembly downwardly and compresses the seal 62; and then draw the resin mixture toward the rails slots 86. At about, for example, minus 5 in. of mercury to channel 65, the manifold assembly has drawn downwardly so that the seal 62 has been sufficiently compressed that the lands 51 abut against the support member 75 to prevent further downward movement of the manifold assembly relative to the support member. Since at least some of the tile pieces bear against the resin mixture, the aforementioned downward movement of the manifold assembly is faster than that of said tile pieces which results in more resilient material being forced into the joint spaces adjacent said tile pieces.

Air is withdrawn from the voids between the resilient pad and the support member much more rapidly than the resin mixture can flow toward the lands; and accordingly the vacuum between the voids and the joint spaces between the tile pieces draws the resin mixture upwardly to fill the voids in the joint spaces between the tile pieces. As the resin mixture flows into each slot 86, the vacuum from the channel being applied to the resin mixture through each such slot is applied to a much more limited area of the resin mixture, the size of each slot being such to retard the flow of resin mixture therethrough and thereby limit the flashing that exists under rails 51, 52. As a result of the application of vacuum to the resin mixture, the resin mixture rapidly spreads to fill all the voids between the rails 50, 51 and the resilient pad and support member.

To be mentioned is that the pressure differential between the channel 65 and the manifold chamber is sufficiently great so that the tile pieces will be drawn upwardly toward the manifold chamber with sufficiently great force to deflect a sufficient amount of pad material into the joint spaces between adjacent tile pieces. This results in the resin mixture being concavely curved to form continuations of finished surfaces of the tile pieces to produce a "finished appearing grouted surfaces" regardless of whether or not the tile pieces have beveled edge adjacent the finished surfaces. Also the above mentioned force is sufficient to preclude seepage of resinous material between the tile pieces and the resin pad into contact with the finished surfaces of the tile pieces even through the vacuum is being applied to channel 65. Thus the maximum vacuum applied to channel 65 during this step is about minus 12 or 13 in. of Hg.

After the sufficient quantity of air has been pulled out of the channel and the resin has flowed sufficiently to close all the vents 86, vacuum no longer will be applied from the channel to the joint spaces between tile pieces other than that which has been trapped. The vacuum trapped in various "pockets" formed due to the non uniform flow of the resinous material, causes the resinous material to fill said pocket and relieve stresses where there has been a build up of excess material.

As the resin mixture is pulled upwardly relative to the support member into the joint spaces, it relieves the compressed forces exerted thereon by the tile pieces. As a result the extra pad material that was forced in an upward direction (overly compressed) now returns the tile pieces to a position more closely adjacent the support member surface. Thus at the time the resinous mixture has spread to flow into all, or substantially all of the vents, the resinous mixture isolates the individual tile pieces from the application of the vacuum in the channel 65. Further at the time the vacuum in the channel is lowered to about 5" (by way of illustration and not a limitation), heating fluid was passed through the support member passageway 77. The initial heating of the resinous mixture causes it to flow more rapidly, but it is rapidly cured thereafter. These factors contribute to the resinous mixture completely filling the voids between the tile pieces while at the same time the resilient pad moves the tile pieces to the desired height above the support plate, for example, .10–.15 inch.

To be mentioned, it is advantageous to use a manifold plate having lower rectangular bore portion 40a (FIGURE 8) rather than cylindrical shaped bore portions since the distribution of force acting to cause deflection of the resilient pad into the joint spaces is more evenly distributed around the tile piece than if a cylindrical flange was used. That is in using a cylindrical bore portion adjacent the pad, a finished surface of the joint spaces may be very slightly uneven since the distance from a corner edge of a tile piece to the projection of the cylindrical bore portion is less than the distance from the mid point of the tile piece to the central axis of said cylindrical bore portion. Thus the manifold plate 36 advantageously includes a lower member 36a having the generally rectangular bore portions 40a formed therein that forms part of bores 40, member 36a being in fluid sealing engagement with the member of the plate 36 to which it is attached.

After the resin mixture has sufficiently cured, valves 44, 69 are operated to a closed condition and air under a pressure applied through valves 64, 72 to return the manifold chamber and channel 65 to atmospheric pressure. The tile panel is removed and the flashing that extended into vents 86 is trimmed off. As a result there is provided the finished tile panel 90 which is partly illustrated in FIG. 10. The panel 90 includes the plurality of spaced tile pieces 16 and the hardened, cured resinous mixture mounting said tile pieces which comprises a backing layer 91 have a substantially planar back surface, a perimetric border 92 that surrounds the outermost rows of tile pieces of the panel, and joints 93 that fill the prior joint spaces between the tile pieces. The backing 91, border 92 and joints 93 are integrally joined, the width W of the border being substantially one half of the corresponding dimension of a joint. Further the finished surfaces 94 of the joints are concavely curved, the appearance of the top surface of panel 90 being the same as that of panel 148 illustrated in FIGURE 15. In this connection note that rails 51, 52 have a recess 51d so that the perimetric border will have one half of a concaved curved surface.

Due to the provision of borders 92, two tile panels 90 can be placed in edge abutting relationship and from a very short distance it is not obvious where one panel ends and the other begins. The panels can be easily nailed to a supporting surface by driving nails through the joints or through the use of a suitable adhesive applied to the back surface of the panel adhered to the supporting surface.

Referring to FIGURES 11–14 there is in part illustrated a second embodiment of the invention which includes a gridded tile mounting board having a generally planar tile mounting board 110. A plurality of parallel longitudinally extending grids and parallel transversely extending grids 113 are integrally formed with the upper surface portion of the tile mounting board to demark an area of a size and shape to retain the individual tile pieces 116 in the ultimate desired horizontal spaced relationship (transversely and longitudinally) of the preformed tile panel.

After the tile pieces 116 have been properly positioned on the tile mounting board, then the vacuum manifold assembly, generally designated 115, is lowered onto the tile mounting board to pick up the tile pieces while retaining them in the spaced relationship in which they have been positioned on the board 110. The manifold assembly includes a manifold plate 118 that in horizontal cross section is about or greater than twice the area of the tile mounting board. Bolted to the underside of the manifold plate by bolts 119 in depending relation are a pair of parallel side rails and a pair of parallel end rails 120;

there being provided a spacer 122 intermediate each of the rails and the manifold plate respectively. The spacers 122 and the rails 120 enclose generally rectangular openings similar to that disclosed relative the first embodiment. The rails 120 respectievly are mounted to have their inner vertical edges horizontally spaced from the adjacent vertical faces of the outermost rows of tile pieces a distance approximately one-half of that between the adjacent pair of tile pieces on the tile mounting board.

Also mounted on the manifold plate 118 in abutting engagement with the undersurface thereof by a plurality of manifold spools 125 is a pad 117 made of resilient material, the material preferably being the same as that described relative pad 56, and of a size similar to that described relative said first embodiment.

The resilient pad has a plurality of perforations 117a formed therein; the perforations being spaced similarly to that disclosed relative perforations 56a. Each of the perforations 117a is located to open to the reduced diameter bore portion 118d of the adjacent bore formed in the manifold plate, each bore including an enlarged diametric portion 118c that at its lower end opens to the lower portion 118d to form a shoulder 118e therewith and also opens through the upper surface of the manifold plate.

A manifold spool 125 is mounted in each of the manifold plate bores and has a reduced diameter portion 125a extended through the adjacent bore portion 118d and the adjacent resilient pad perforation 117a. Integrally formed with the reduced diameter portion 125a is a lower cylindrical spool flange 125b that has a substantially larger outside diameter than the diameter of the pad perforation but a substantially smaller diameter than the diameter of the bore portion 118d. Integrally joined to the opposite end of the reduced diameter portion 125a is an enlarged upper cylindrical flange 125c, the outer diameter of the flange 125c being such that the outer peripheral portion thereof forms a close sliding fit with the peripheral wall of the manifold plate wall bore portion 118c. Accordingly, when the manifold spool is in its lowermost position, the upper flange 125c rests on the shoulder 118e to preclude further lowering of the manifold spool relative to the manifold plate; while at the same time, the upper horizontal surface of the lower flange 25b abuts against the lower surface of the resilient pad to hold the upper surface of the resilient pad in abutting relationship with the lower surface of the manifold plate. Each manifold spool includes a central vertical aperture 125d that at its lower end opens through the lower surface of the spool flange 125b and at the opposite end opens through the uper surface of the spool flange 125c. As an example, the aperture 125d may be 0.3 inch in diameter.

The manifold plate 118 is bolted or otherwise appropriately secured to the manifold body 127 to be in depending relationship thereto and in fluid sealing engagement therewith. The manifold body includes a manifold chamber 128 that opens to each of the manifold plate bore portions 18c (see FIGURE 12). An upright boss 130 is secured to the central top portion of the manifold body 127, the boss 130 having a fluid passageway 131 therein that opens into the manifold chamber through an appropriate aperture formed in the manifold body. The opposite end of the fluid passageway 131 is fluidly connected to a vacuum source 121.

After the tile pieces have been positioned on the tile board, the manifold assembly 115 is mechanically lowered sufficiently to bring the lower surface of each spool flange 125b into abutting engagement with the upper central surface of a tile piece on the tile mounting board. At this time the lower horizontal surface of the resilient pad is still in a planar condition. Also the peripheral depending flanges 118f of the manifold plate together with the seal member 133 that is attached to the lower horizontal surface of said depending flanges are still vertically spaced above the upper surface of the tile mounting board by a distance of approximately equal to the depth of the spool flange 125b. The inner vertical surfaces of the depending flanges and the seal member, together with the adjacent vertical surfaces of the spacers 122, rails 120, and the horizontal surface of the manifold plate intermediate the depending flanges and the spacers 122, in vertical cross section form a generally U-shaped channel 135 that extends completely around the tile pieces and is located outwardly therefrom.

The manifold assembly is further mechanically lowered until the peripheral seal 133 abuts against the tile mounting board. This further lowering of the manifold assembly results in the spools 125 being moved upwardly due to their butting against the tile pieces (from FIGURE 11 position to FIGURE 12 position). This upward movement of the spools through the spool flanges 125b, results in annular portions of the resilient pad adjacent said spool flange 125b being deflected upwardly into bore 118, and also the upper spool flanges 125c being lifted off the shoulders 118c. After the peripheral seal 133 is moved into abutting engagement with the tile mounting board and the spools have moved in the aforementioned manner, vacuum is applied through the boss 130 to the manifold chamber 128 and thereby to the manifold bore portions 118c and through spool apertures 125d to the central top portion of the tile pieces.

The initial application of vacuum will, due to leakage around spool flanges 125 and the adjacent tile pieces, result in the withdrawal of air from the space bounded by seal 133, the manifold plate and the alignment platform to thereby draw the manifold body downwardly and compress seal 133. This downward movement of the manifold body will cause the initial compression of the resilient pad to deform it such that it will abut against the tile pieces and form an angular pocket 117f around flange 125b (see FIGURE 13 where this pocket is of reduced size due to still further compression of the pad). Since the spools make the initial contact with the tile pieces, the spools reduce the abrasion of the pad from what would occur if no spools were provided (this being the case for all embodiments of the invention where manifold spools are provided).

Due to the resilient pad abutting against the tile piece there is formed a fluid seal, which effectively makes the spool flange a part of the pad face after the spools move relatively upwardly as mentioned below. Then the effective area of application of vacuum to a tile piece is the same as the downwardly projected horizontal area of the portion of bore 40 just above the pad.

Due to formation of the aforementioned seals and the piston effect of the spools, the spools are drawn by the vacuum to move further in an upward direction, this relieving the pressure exerted by the tile pieces on the mounting board and thereby the vacuum in the perimetric channel drawing the manifold assembly downwardly to compensate for the relief of pressure so that the tile pieces remain in contact with the tile mounting board. At the same time this movement causes the resilient material surrounding the tile pieces to be deformed into the voids between adjacent tile pieces similar to that illustrated in FIGURE 13. That is the application of vacuum in causing further relative upward movement of the spools and tile pieces further compresses the resilient pad to cause convexly curved deflections of the material 117b into the joint spaces between the tile pieces. A vacuum of 20 inches of mercury applied through boss 130 to chamber 128 is suitable for compressing the pad 117 of suitable durometer to cause the proper deflection of said pad. At this time the manifold assembly, together with the tile pieces affixed thereto through the application of vacuum to the manifold chamber, is moved away from the tile board (the vacuum in the perimetric channel being released in a suitable manner such as described in connection with other embodiments); and if the tile pieces have not been previously treated with a primer, the tile pieces may be dipped into a suitable container of primer to condition the tile surfaces so that a subsequently applied resinous material will firmly adhere thereto.

Now the manifold assembly together with the tile pieces affixed thereto is lowered onto the generally planar heat transfer support member 140 that has longitudinal and transverse grids 141 of the same size, shape and configuration as the grids 113 of the tile mounting board. When the manifold assembly is lowered unto the support member 140, the grids 141 are in the same vertical relationship to the tile pieces on said assembly as that of the tile pieces relative to the grids 113 of the tile mounting board.

The support member 140 has a plurality of tubular passages 145 located beneath the upper horizontal surface thereof for selectively applying heat and cooling the top surfaces of said support member. At the time the manifold is being lowered the support member is in a cooled condition.

Prior to lowering the tile pieces to the proper position relative the support member 140 to form a tile panel, an uncured resin mixture in an appropriate quantity is placed on the top surface of the support member 140 which is coated to readily release from the resin mixture. For example, the resin mixture may be placed on the support member 140 over the gridded surface through the use of a pattern board similar to that described relative FIGURES 6 and 7.

The manifold assembly is lowered to bring the seal member 133 into sealing engagement with the support member 140 and then a vacuum is applied through a connection 143 that at one end opens through the aperture 146 into the peripheral channel 135 and at the opposite end is fluidly connected through line 142 to the vacuum source 144. This application of vacuum (for example, 13 to 14 in. of mercury) withdraws air from the channel 135; and due to the spacing of the rails 120 above the support member 140 (the bottom surfaces of the rails being planar, i.e. no lands such as 51a), also applied vacuum in the voids between the tile pieces and the voids between the under surfaces of the tile pieces and the support member 141 (and resin mixture), if any. This application of vacuum through the channel 135 draws the manifold assembly downwardly and compresses seal 133.

Now the uncured resin mixture is heated due to passage of, for example, steam through passageway 145. Due to the vacuum applied through line 142 drawing the manifold assembly with tile pieces downwardly against the resin mixture, the resin mixture completely fills the voids between the tile pieces and said pieces and support member 140. There advantageously be provided spaced stops on support members 140 to abut against rails 120 to limit the downward movement of assembly 115.

That is the resin mixture fills the voids (joint spaces) between the tile pieces, and at the location of contact with the pad 117 provides a finished surface. This results since the application of vacuum through manifold spools draws the tile pieces toward the manifold plate 121 with sufficient force to cause portions 117a of the resilient material 117 to be extrued into the joint spaces between the tile pieces a sufficient amount so that the resin mixture will be contoured adjacent the finished surfaces of the tile pieces to produce a "finished appearing grouted surfaces" regardless whether or not the tile pieces have beveled edges adjacent the finished surfaces. Also the above mentioned force is sufficient to preclude seepage of the resinous material between the tile pieces and the resilient pad into contact with the finished surfaces of the tile pieces even though a vacuum is also being applied through channel 135. The backing has grid lines (indentations extending transversely and longitudinally) on the back surface thereof as a result of the cross intersecting grids 141. Thus the resinous material fills the voids between the unfinished surfaces of the tile pieces and the bottom surface of the support 140 to provide a backing having a gridded exterior surface that is integrally joined to the resinous material in the joint spaces between the tile pieces.

It is to be noted that the vacuum applied between the voids of the tile pieces draws the resin mixture therein faster than the resin mixture can flow outwardly beneath the rails 120. Further the vacuum applied through boss 130 is sufficiently greater than that applied through line 142 so that the tile pieces are held against the pad 117 similar to that illustrated in FIGURE 13 and described above. The resin is substantially cured before the manifold assembly is raised from the support member 140.

After the resin mixture is substantially cured, the application of vacuum through port 143 is discontinued and then either the manifold assembly raised and then the preformed tile panel removed therefrom; or else the vacuum being applied through the chamber 127 discontinued prior to the raising of the vacuum manifold assembly. In either event after the preformed top panel has been removed from either the manifold member 140 or assembly 115 respectively, it is trimmed to remove the excess material around the peripheral border including that which flowed between the rails 120 and the tile pieces to provide the finished panel 148 of FIGURES 15 and 16. The panel 148 includes the tile pieces 116 bounded together through cured resin material backing layer 150 which is integrally formed with the joint material 149. Since during the forming of the panel, pad portions 117b extended into the joint spaces, the finished surface of the panel 148 is concavely curved at 149a to provide a "finished grouted appearing jointly."

Where a plurality of panels are going to be used in edge abutting relationship than only the excess material that seeped under the side rails 120 is trimmed off. This way each panel at each edge has about one half of the joint material between adjacent rows of tile piece of two adjacent panels as indicated by 149b.

Although the tile pieces illustrated have non-beveled edges, it is to be understood that where tile pieces having beveled edges are used, the surfaces 149a form a continuation of finished beveled surfaces rather than the resin material covering the beveled edges on the finished side of the tile pieces. That is during the time beveled edge tile pieces are affixed to the manifold assembly, pad material adjacent that of 117b would be deformed to fill the cut out beveled portions of the tile pieces that are adjacent to pad 117.

To be noted, with reference to FIGURE 14, is that when the tile pieces are in their lowermost position, the generally planar bottom surfaces are vertically spaced above the planar ungridded portions of the support 140 about the same distance as the height of the triangular shaped grid 141, the height of the grids being a dimension X. The aforementioned spacing of the unfinished surfaces of the tile pieces from the ungridded portions of the support 140 is of a dimension to give a desired thickness of backing to the resulting tile panel, it being noted that the grids apexes are adjacent and between the joint spaces of the tile pieces. Due to the provision of grids 141, the finished tile panel has transversely and longitudinally extending notched out portions 151 and 152 respectively in the backing 150. The purpose of providing the grids on member 140 is to break the stress lines that otherwise would extend across the backing and would cause the subsequently formed tile panel to curve or warp; especially, if it were attempted to provide a fast cure.

Advantages of forming tile panels 148 as described above are that it eliminates providing a backing such as fiber glass backing and still at the same time produces a tile panel having enouugh tensile strength to support its own weight and enough elongation to flex. The grid lines 151, 152 formed in the panel backing 150 permit making hard joints and at the same time permits fast curing without the setting up of undesirable stresses. Additionally through the provision of grid lines in the back surface portions of the tile panels, the amount of resin required to form the tile panel is decreased. Further by using an appropriate resin, a sponge of the nature set forth above, and providing grid lines in the tile backing, the thus formed tile panels can withstand temperatures such as for example 450° F. and still not get too brittle at temperatures of 20° F. below. Accordingly there is very little likelihood of the tile pieces cracking at cold temperatures or the panels losing their strength in the event they are subjected to relatively high temperatures. Additionally through the provision of the panel grid lines, the finished panel will deform sufficiently to conform to somewhat warped surfaces, provided the degree of warping is not too great. Usually the process of FIGURES 11–14 is used where it is desired to use a substantiail thicker backing layer than which is produced using the process of FIGURES 1–10.

As a less preferable way than that described relative FIGURES 11–14, the tile panels may be made by using a gridded tile mounting board having an upright perimetric flange that is spaced a small distance from the outermost grids. In place of the manifold assembly there is provided a manifold body of a size to abut on said perimetric flange and a manifold plate secured to the manifold body to provide a manifold chamber, said plate being of a larger cross sectional area than the gridded are of the tile mounting board but a slightly small area than that enclosed by said flanges. There is provided a resilient pad having apertures spaced similar to that of pad 117 but of about the same diametric spool apertures 125d the pad apertures being spaced to open through the manifonld plate apertures to the manifold chamber. The diameters of the pad apertures and the manifold apertures are about equal. Advantageous the combined thickness of a tile piece, the resilient pad and manifold plate is slightly less than the height of the perimetric flange above the planar surface portions of the tile mounting board.

In using the thus modified manifold assembly, the tile pieces are positioned on the tile mounting board; and if the resilient pad is not attached to the manifold plate, it is first properly positioned over the tile pieces and then the manifonld assembly lowered to register the manifold plate and pad apertures. Then a vacuum is applied to pick up the tile pieces and cause the pad to deform into the joint spaces as described heretofore.

The thus picked up tile pieces are then lowered into a resin pan having a gridded bottom and a perimetric flange to form a fluid seal with the manifold body; and at the same time, space the bottom surfaces of the tile pieces above the pan bottom such as illustrated with reference to the support member of FIGURE 14, when a vacuum is applied through a port in the pad perimetric flange that is in fluid communication with the joint space voids. A liquid resin mixture may be pumped or allowed to flow through a supply port to form the joint space and backing material (similar to that illustrated for the resin of FIGURE 14) after a vacuum has been applied through said vacuum port. Advantageously the pan may be provided with an annular shoulder having a horizontal surface underlaying but slightly vertically spaced from the lower surfaces of the pad that extend horizontally outwardly of the tile pieces. The vacuum port and resin supply port open into this space on opposite sides, the annular shoulder vertical surface being spaced from the vertical surfaces of the outer rows of tile pieces as disclosed relative to rails 120. Also to be indicated is that the resin pan may be heated and cooled by, for example, the provision of tubular passageways through the pan. After curing and trimming, the finished tile panel using the modified apparatus would be the same as described heretofore relative FIGURES 15 and 16.

It is also contemplated that the tile panels may be automatically formed as will be described hereinafter. For example, mechanism for forming such tile pieces includes a continuous conveyor generally designated 160 that includes a pair of chains extended over axial spaced sprockets 162 on an idler shaft 163 at one end and a second pair of axial spaced sprockets on the drive shaft 164 at the opposite end (see FIGURES 17–20). Each of the aforementioned chains includes a plurality of mounting links 166 and connector links 167 which are pivotally connected at 168 with a link 167 between each pair of links 166. Between transversely corresponding pairs of links 166 of the chains and mounted on offsets 166a of a pair of links 166 is a transversely elongated block 169 having an upwardly extending flange 169a at the rearward edge thereof, the direction of travel of the upper run of the conveyor 160 being indicated by arrow 170. The longitudinal length of each block is such that each adjacent pair of blocks is longitudinally spaced by links 166 in order to permit them being carried around the sprockets 162.

Each of the flanges 169a is provided with a plurality of grooves 169c through which longitudinally extending wires 171 are passed. As may be noted from FIGURE 20, the height of a flange 169a is less than the height of a tile piece 172 positioned on the horizontal leg 169d of the block. Advantageously a vibrated support 175 is attached to each of the one ends of the wires to vibrate the wires to transversely space the tile pieces that are placed on the blocks, the opposite ends of the wires being attached to a transverse support member 176. The aforementioned spacing of the tile pieces is such to conform to the spacing of the tile pieces in the subsequently finished panel.

The second conveyor or chute 179 is mounted on structure (not shown) to have the forward edge thereof extend over and adjacent the rearward end of the upper run of the conveyor 160, the bottom edge of the chute 179 being slightly vertically spaced above the top edge of the upper run block flanges 169a. The chute advantageously may be provided with longitudinally extending ribs 180 for properly or at least partially transversely spacing the individual tile pieces 172 (which have ben treated with primer before being placed on the chute) before they are dropped onto a block 169 passing beneath the forward edge of the chute. Advantageously the chute also may be inclined at an angle such that a slight pushing force is required to push the forwardmost tile pieces on the chute to drop onto the respective block. As may be noted from FIGURE 20, the flanges of adjacent pairs of blocks are longitudinally spaced a slightly greater distance than the longitudinal length of the tile piece. Accordingly the block flanges properly longitudinally space the tile pieces.

In advance of the froward end of the chute 179, there is mounted a bristle brush 183 rotating in the direction of arrow 84 to brush the tile pieces against the vertical surface of the respective flange 169a and to clean the horizontal tile surfaces of the tile pieces on the conveyor 160 as the upper run there is moved in a forward direction. This even more longitudinally aligns the tile pieces to properly longitudinally space them.

In order to form tile panels after the tile pieces are positioned on and carried by the continuous conveyor, there is provided a manifold assembly, generally designated 190, which is of a somewhat modified construction from that of manifold assembly 115. The assembly 190 includes a manifold body 127 having a manifold chamber 128, a manifold plate 190d having spool apertures for mounting spools 125, a resilient pad 117 mounted by spools 125 on the manifold body and spaces 122. However there is not provided rails 120; the manifold plate depending flange 190e together with the peripheral seal extended to about the same elevation as the bottom surface of spacers 122 providing a perimetric channel 190f into which the vacuum connection 191 opens.

The manifold assembly 190 has an upwardly extending boss 194 that at its upper end is connected to the radially extending arm 195, the opposite end of arm 195 being connected to a rotary portion of a central post 196. The post includes a stationary portion, the stationary and rotary portions including cooperating structure 196a to provide a valving action as described hereinafter. The boss 194, radial arm 195 and the rotary post portion have a fluid passageway 197 for placing the manifold chamber of manifold body in fluid communication with said valving structure 196a for controlling the application of vacuum from the vacuum source to the manifold chamber in the desired timed relationship. The valving structure 196a is diagrammatic illustrated in FIGURE 18 as spaced from the post but actually would be located within the post. Since the structure for controlling the application of vacuum does not form a part of this invention, it will not be described. Additionally connected to the post 196 is suitable indexing mechanism designated 198. The indexing mechanism is synchronized with the movement of the conveyor 160 such that when the conveyor 160 is stopped, the manifold 190 is lowered to pick up a plurality of tile pieces (solid line position of FIGURE 19, phantom position 190a of FIGURE 18). Then a vacuum is applied through valving 196a and passageway 197 to the manifold chamber to pick up the tile pieces 172 and then the manifold assembly elevated. Next the conveyor 160 is actuated and the indexer swings the post 196 in the direction of arrow 207 to position the manifold assembly above the support member 200 (solid line FIGURE 18 position). The manifold assembly is then lowered into sealing engagement with support member 200 (if necessary, suitable guides being provided along side the support members).

The support member is somewhat modified from that of support member 140, support member 200 including a perimetric flange 200a to abut against the depending flange 190e of the manifold plate and form a fluid seal therewith. Flanges 190e, 200a are of heights to space the bottom surface of the manifold plate, through which spools 125 extend, substantially the same distance from the top gridded surface of support member 200 as indicated for the corresponding structure of FIGURE 14. The support member perimetric shoulder 200b has inner vertical surfaces correspondingly located as inner vertical surfaces of rails 120 and a top surface that is vertical spaced from the spacers 122 of assembly 190 an amount corresponding to the spacing of the bottom rails 120 from the non gridded surface of support member 140 as shown in FIGURE 14.

The shoulder 200b has a port 201 that opens through the inner vertical surface of the shoulder 200b. The port 201 is fluidly connected through control meter valving 202 which in turn is connected to the liquid resin supply 203. After a vacuum has been applied to channel 190f through vacuum connection 191, the valve 202 opens to meter beneath the manifold assembly 190 (pump onto the support member) an appropriate amount of resin mixture from the supply 203 which then is turned off automatically. The resin mixture fills the voilds to provide the backing and joint material similar to that indicated with reference to FIGURE 14. Now the application of vacuum through connection 191 is discontinued and the pressure in chamber 190f returned to atmosphere.

With reference to the application of vacuum through connection 191, it is fluidly connected to the valving 196a through fluid line 204 which extends along arm 195 and down through a separate fluid passageway in the rotary post portion to valving 196a. The indexer discontinues the vacuum through line 204 and after the resin mixture is substantially cured, elevates the manifold assembly and then swings it above conveyor 204 (phantom position 190b of FIGURE 18). At this time the vacuum in the manifold chamber is discontinued, said chamber returned to atmospheric pressure, and the tile panel released onto conveyor 204a to be subsequently trimmed and stored. Then the manifold assembly is again swung to position 190a of FIGURE 18 and lowered to repeat the cycle.

Although only one manifold assembly and associate structure for controlling the movement of and operation of said assembly has been described and illustrated, it is to be understood a number of longitudinally spaced posts, manifold assemblies, synchronized indexers, and associated structure may be provided in order that the time interval of stopping the conveyor 160 may be minimized while at the same time permitting such manifold assembly to be properly cycled. This of course would require proper timing of the various indexers in relation to the synchronized drive.

It is to be understood in place of members 201, 202 and 203 for applying the resin mixture to the support 200, resin mixture may be applied as indicated with reference to FIGURE 6 and then heated.

Referring now in particular to FIGURES 21–25 inclusive, another embodiment of apparatus of this invention, generally designated 300 will now be described. The apparatus 300 includes a generally rectangular frame having longitudinal frame members 301a, and transverse frame members 301b and 301c connected together at their ends to enclose the generally rectangular opening. Legs 302 are provided for supporting the aforementioned frame in an elevated condition.

Mounted by the frame for movement relative thereto and relative to each other are a manifold assembly, generally designated 305; a heated platen, generally designated 306; and an alignment assembly generally designated 307. However other than for the differences noted hereinafter, the manifold assembly 305 is basically of the same construction as the vacuum manifold assembly 35 which was described with reference to FIGURES 1–4. That is in referring to FIGURE 25, the manifold assembly 305 includes a manifold plate 310, a manifold body 311 that in conjunction with the manifold plate provides a manifold chamber 312, an apertured resilient pad 314 attached to the manifold plate by manifold spools (not shown) which are mounted by the manifold plate in a manner illustrated in FIGURE 4, spacer rails 317 (see FIGURE 23), side and end rails 313, peripheral resilient seal 315, angle brackets 318 mounted by the manifold plate, and a perimetric, U-shaped channel 316 bounded by bracket 318, the manifold plate, rails 313, 317 and seal 315. Rails 313, 317 are secured to the manifold plate. Rails 317 do not have lands 51a and are of a correspondingly smaller vertical thickness. The cross sectional area bounded by seal 315 may be less than twice as large as that bounded by rails 313.

Vertically extending reinforcing flanges 322 are attached to the side of the manifold body opposite the manifold plate, there being provided an elongated stop 323 attached to the reinforcing flange adjacent one transverse edge of the manifold body to extend generally perpendicular thereto. The purpose of providing a stop will become more apparent hereinafter. Also attached to the opposite transverse edges of the manifold body to extend outwardly therefrom are a plurality of apertured guide lugs 324.

Fixedly attached to opposite longitudinal edges of the manifold body 311 and frame 322 to extend outwardly therefrom are tubes 326 and 327 respectively, the tubes in the manifold lowered position extending through the centrally located, upwardly opening notches 303 in the frames. Since the structure for supporting tubes is the same, only the structure for supporting tube 326 will be described (see FIGURE 23).

The tube 326 is rotatably extended through the annular mount 331 which in turn is welded to the upper end of the piston rod 328 of the two way acting piston cylinder combination generally designated 329. The piston cylinder combination in turn is mounted on a plate 330 that extends outwardly from the frame and beneath tube 326. The cylinder of combination 329 is connected through fluid lines 332 to a control valve (not shown) of a construction to alternately force the piston rod in the direction of arrows 333, in a direction opposite arrow 333, and to allow the piston and the structure mounted to move therewith to "float."

On only tube 326, an annular member 335 is provided on the outer end thereof, there also being provided a handle 336 having a bifurcated end portion pivotally mounted on pivot member 337 which is extended through tube 326 and annular mount 335. Due to the aforementioned mounting of the handle it may be pivoted through an angle of 180° about an axis perpendicular to the transverse pivot axis of the tubes 326, 327 from the depending position illustrated in FIGURE 23 to a diametrically opposite position. In order to releasably retain the manifold assembly in a generally horizontal condition, a notched plate 339 is fixedly attached to the upper end of the cylinder, the handle being slideably positionable in the notch which extends in a generally transverse direction. With the handle in the aforementioned notch, the tubes are prevented from rotating, however, upon the operator moving the handle about the axis of pivot 337 in the direction of arrows 338 to a position out of the notch, the manifold assembly may be pivoted.

In order to align the individual tile pieces 16 and move them to a position to be picked up by the manifold assembly 305 there is provided the alignment assembly 307 (see FIGURES 21 and 24). The assembly 307 includes a heavy base plate 345 having an open perimetric frame 346 to extend thereabove, the frame being of a size to have the perimetric seal of the manifold assembly form a fluid seal therewith. Inside of the frame 346 and in abutting engagement therewith is a spacer frame 347 bounding a rectangular opening. Located within the last mentioned opening and mounted on the base plate 345 is a rectangular constant temperature member 349, there being provided electrical elements and controls (not shown) for retaining said member at a constant temperature. Mounted to vertically move in the space between member 349 and the spacer frame 347 is an alignment frame 348. The alignment frame is mounted in a manner such as described with reference to FIGURE 2 and is similarly resiliently retained in an upper position to extend above the vertically central portion of the tile pieces 16 positioned on the assembly 307 as will be described hereinafter. Advantageously a fabric pad or pads of substantial thickness may be overlaid on member 349. In using assembly 307 the tile mounting board 10 having the tile pieces arrayed thereon as indicated with reference to FIGURE 1 is positionable on the pad 350 in order that the tile pieces may be aligned in the manner described with reference to FIGURE 2.

The assembly 307 in a datum position as illustrated in FIGURE 21 is just to the right of the manifold assembly 305 and longitudinally spaced therefrom. In order that the assembly 307 may be transitorily moved to a position just beneath the manifold assembly in an elevated condition, a horizontal slide rail 353 is attached to each of the longitudinal frame members to extend from a position adjacent to the heated platen 306 to the transverse frame member 301c and at an elevation just beneath the lower horizontal edge of the notch 303. The alignment assembly includes a slide rail 354 secured to each longitudinal edge of the base plate 345 and extends outwardly therefrom sufficiently in order to slidably support said assembly on the rails 353.

In order to reciprocally move the assembly 307 from the position illustrated in FIGURE 21 to a position directly beneath the manifold assembly when the latter assembly is in an elevated position as illustrated in FIGURE 24, a longitudinally extending two way acting piston cylinder combination 356 has one end of the cylinder secured to central portion of the transverse frame member 301c and the piston rod secured to the plate 357 which at its upper end is welded to the edge portion of the base plate 345 that is adjacent the manifold subassembly. Supply lines 358 are connected to the opposite ends of the aforementioned cylinder through an appropriate control valve to a source of air under pressure (not shown) for selectively actuating the combination 356 to move the assembly 307 from the datum position (in the direction of the arrow 360) to a position directly underlying the manifold assembly wherein the peripheral seal 315 is positioned directly above the perimetric frame 346; and thence back to the datum position illustrated in FIGURES 21 and 22.

In order to align the manifold assembly in the aforementioned manner with the alignment assembly as the manifold assembly is lowered, guide lugs 361 having upwardly projecting pins 362 that are tapered at their upper end are mounted outwardly of frame 346 to extend thereabove and to be in alignment with the apertured lugs 324 of the assembly 305 in a position rotated 180° about the axis of the tubes 326, 327 from that illustrated in FIGURES 21 and assembly 307 beneath assembly 305 after assembly 307 has been moved in the direction of arrow 360 by piston cylinder combination 356.

The heated platen 306 includes a heated member 365 of a rectangular configuration and of an area substantially larger than the area of the manifold assembly. Member 365 includes a depending rectangular portion 365 of about the same area as that enclosed by the outer vertical edges of rails 313. The assemblies 305, 306 and 307 are of a construction to provide a finished tile panel such as described with reference to FIGURE 10.

Member 365 has a winding fluid channel 366 formed therein that at one end opens through an outlet port to the flexible fluid line 368 which in turn is connected to an overhead steam or hot water supply line (not shown). The opposite end of channel 366 is connected through an outlet port to one end of the rigid outlet line 369, the opposite end of line 369 extending to an elevation beneath member 365 and is connected to a flexible exhaust line (not shown). Controls (not shown) are provided to keep the heated platen at a substantially constant temperature at all times that apparatus 300 is being used.

In order to move the rectngular member 365 from the datum position illustrated in FIGURE 21 to a position directly above the manifold assembly 305 when said assembly is in a lowered condition and rotated 180° from that illustrated in FIGURE 21, there is provided a two way acting piston cylinder combination 371 that has a piston rod connected to the upwardly extending block 372. The lower end of the block is welded to the top central edge portion of member 365 that is adjacent the manifold assembly. The opposite end of combination 371 is fixedly attached to the upright block 373, the lower end of said block being secured to transverse frame member 301b. Fluid supply lines 374 are connected to the piston cylinder combination to selectively actuate the piston thereof so that the rectangular plate 365 is moved in the direction opposite arrow 360 to a position overlaying the manifold assembly 305 and retracting said rectangular plate to the datum position. The lines 374 extends through a control valve (not shown) to a source of air under pressure.

In order to facilitate the movement of the rectangular member 365 relative to the frame, there are provided a plurality of depending wheel mounting blocks 376 at each longitudinal edge of the rectangular member 365. Each wheel mounting block 376 mounts a wheel 377 to extend outwardly therefrom and positioned to ride on the adjacent horizontal track 378, the tracks in turn being mounted on the longitudinal frame members 301a to extend from a position adjacent the transverse rail 301b to a position adjacent the transverse edge of the manifold assembly which is closest to the alignment frame assembly. As may be noted in FIGURE 21 the tracks 378 are made of two pieces, the two pieces of each track being spaced by a longitudinal dimension distance substantially equal to the longitudinal length of the respective notch 303. Each longitudinal side of member 365 has three wheels spaced similar to that illustrated in FIGURE 21 such that it has two pair of wheels on track portion 378a that will run over the respective tubular member 326, 327 to the track portion 378b when the manifold assembly is in a lowered position and the member 365 moved in the direction opposite arrow 360. The said two pair of wheels are longitudinally spaced a greater distance therein the longitudinal length of a notch 303. Further the tracks are provided with upwardly extending flanges to prevent the wheels running off the tracks after they have passed or are being passed over the tubular member 326, 327.

In order to control the application of air under pressure to the manifold chamber 312 and to the perimetric channel 316 there are provided solenoid operated air control valves 381 and 380 that are respectively mounted on the manifold body. Each of the valves 380, 381 is located in a separate flexible fluid supply line 386 that at one end opens through a connector 385 to the manifold chamber or perimetric channel, passes through the respective control valve, and thence through the interior of the tubular member 327 to a source of air under pressure (not shown). Separate electrical control lines 379 are connected to valves 380, 381 respectively and thence through tubular member 327 to a source of power and separate control switches (not shown).

In order to control the application of vacuum to the manifold chamber and the perimetric channel respectively there is provided solenoid operated control valves 382 and 383 which are also mounted on the back side of the manifold body. A separate line 388 is provided for each of the valves 382, 383 that at at one end opens through a connector 384 to the manifold chamber and perimetric channel respectively, then passes through respective valve 382, 383 and thence through the tubular member 327 to a source of vacuum (not shown). Advantageous valves 44, 64, 69, 72 and 380–383 may be such as those sold by Barksdale Valves, Los Angles, Calif. model #1751 SOAC 2A1.

A vacuum gauge 390 is connected to a flexible line that passes through tubular member 327 to a connector 394 that opens through the manifold chamber to at all times indicate the negative pressure therein, if such is the case. Likewise there is provided a connector 395 that opens to the perimetric chamber and connected through a flexible line to the vacuum gauge 391 to indicate the negative pressure in said channel. Gauges 390, 391 are mounted on an instrument panel 393 which in turn is mounted on the tubular member 327 to rotate therewith.

In order to prevent the lines passing through tubular member 327 being twisted off, the stop 323 is provided to extend to an elevation such that upon rotating the manifold assembly from the datum position a few degrees in the direction opposite the arrow 375, the stop will abut against the heated platen to prevent further rotation, regardless if the manifold assembly is in its elevated condition or its datum condition as illustrated in FIGURES 21 and 22. Thus when the manifold assembly is positioned in its datum condition it only can be rotated through an angle180° in the direction of the arrow 375. Further the manifold assembly in either an elevated condition or a datum condition cannot be rotated in the direction of arrows 375 through an angle of 360° since if such were attempted, the stop 323 would engage the lower surface of the heated platen.

The structure of the apparatus of FIGURES 21–25 having been described, the operation thereof will now be set forth. In describing the operation of the apparatus, it will be assumed that said apparatus is in a datum condition of FIGURES 21, 22 that no vacuum or air under pressure is being applied to the manifold channel or perimetric channel, and that no tile mounting board has been positioned on the alignment assembly 307. In using the apparatus 300 a tile mounting board 10 is positioned on a vibratory mechanism 11 and individual tile pieces 16 arrayed thereon such as described with reference to FIGURE 1. After tile pieces have been arrayed on the tile mounting board, the tile mounting board is positioned on assembly 307 within frame 348, the tile pieces inspected for any imperfections (any imperfect tile pieces being replaced), and the tile pieces on the peripheral edges of the board 10 wiped to abut against the alignment frame 348. Now the control valve of cylinder 329 is operated to translationally elevate the manifold assembly in the direction of arrows 333 from the position illustrated in FIGURE 21 to the FIGURE 23 position.

After the manifold assembly has been elevated to the FIGURE 23 position, the controls for the piston cylinder combination 356 are operated such tha air is supplied to the cylinder thereof to move the assembly 307 in the direction of arrow 360 to a position that the assembly 307 is located directly beneath the manifold assembly. At this time the control for piston cylinder combination 329 is operated to a "float" condition and thereupon the manifold assembly lowers until the perimetric seal 315 abuts against the perimetric frame 346. At this time the control for the manifold chamber vacuum control valve 382 is operated to withdraw air from the manifold chamber, and accordingly also from the perimetric channel until the tile pieces form a seal with the resilient pad. That is normally when the seal 315 abuts against frame 346, there is leakage of air between the tile pieces and the spools such that air is withdrawn from the entire area bounded by seal 315 until such time seal 315 has been sufficiently compressed and the manifold plate moved downwardly relative the tile pieces to form a fluid seal with the resilient pad (see description relative FIGURES 11–14). Thus both vacuum gauges 390, 391 initial indicate a drop in pressure. However at about 5–6 inches of mercury, the last mentioned fluid seal is formed and thence air is no longer withdrawn from beneath the tile pieces and then from under rails 313. Thus the channel gauge now indicates a constant pressure.

The pressure in the manifold chamber thence continues to drop from about 5–6 inches of mercury to the desired pressure of about 20 inches of mercury to firmly affix the tile pieces to the manifold assembly, and thence the control for the perimetric channel control valve 380 is operated to admit air under pressure to release the vacuum in said channel (return to atmospheric) as has been previously described with reference to the embodiments of the invention of FIGURES 1–5.

Now the manifold assembly is through piston cylinder combinations 329 elevated and the combination 356 operated to retract the alignment assembly to the datum position of FIGURES 21 and 22. With the manifold assembly in an elevated condition, the handle 336 is pivoted in the direction of arrow 338 out of the notch of the notched plate 339 and thence the handle rotated in the direction of arrow 375 to rotate tubular member 326 and the structure mounted by tubular members 326, 327 through an angle of 180° so that the resilient pad and tile pieces picked up by the manifold assembly face in an upward direction. The handle is returned into the notch of the notched plate to prevent accidental rotation of the manifold assembly. After the manifold assembly has been thus rotated the control for piston cylinder combination 329 is again operated and the tubes 326, 327 are lowered to position such as illustrated in FIGURE 25, whereby the uppermost edges of the manifold assembly are located at the lower elevation than the lowermost surface of the rectangular member 365 of the heated platen.

A pattern of an uncured resin mixture is applied to the tile pieces, for example, a pattern such as illustrated with reference to FIGURE 6. The mixture may be applied by a hand held spray gun or an automatic dispenser that deposits a given volume of the mixture in the desired pattern (with or without a pattern board). Now, advantageously, a closely woven coated cloth 400 may be overlaid on the resin mixture, tile pieces and rails 313 to provide a good release from the cured resin mixture.

At this time the control for piston cylinder combination 371 is operated whereby the piston and piston rod thereof are extended to thereby move the rectangular plate 365 to a position that is directly above the manifold assembly. Now the control of the piston cylinder combinations 329 is operated such that combination 329 will raise the manifold assembly to a position that the peripheral seal 315 abuts against the rectangular plates 365 and lifts the heated platen sufficiently so that the wheels 377 are only slightly elevated off the track 378. Thereafter the perimetric channel control valve 383 is operated to withdraw air from the perimetric channel until the gauge 391 reads approximately 13 inches of mercury. The withdrawal of air from the perimetric channel results the assemblies 306 and 305 moving more closely adjacent one another (the perimetric seal being compressed).

To be mentioned is that the drawing together of the platen and manifold assembly due to the vacuum in the perimetric channel and the weight of the platen acts through pad 400 and the uncured resin to the then top surfaces of the tile pieces to depress said tile pieces, but still leave the said top surfaces a few thousandths of an inch vertically higher than the then top surface of rails 313 to provide vents to the joint spaces between the tile pieces. During this interval of time air is withdrawn from the voids between the tile pieces and the rail 13 and also pressure is exerted against the resin mixture to cause it to flow into said voids and form a backing over the top surfaces of the tile piece (both due to the vacuum in the joint spaces and that resulting from the member 365 moving toward the manifold body). A small amount of excess resin usually will overrun the rails but there is left a thin layer covering the then top surfaces of the tile pieces to form said backing player.

The assemblies 306, 307 are left at the 13 in. mercury position until the time the resin has a chance to cure, which is a matter of a very few minutes. Thereafter the controls for the vacuum valves 382, 383 are operated to an off position and the controls for valves 380, 381 are operated so that air under pressure is applied to the manifold chamber and the perimetric channel such as described with reference to the first embodiment. Thence the control of the piston cylinder combinations 329 is operated such that tubes 326, 327 are moved to their lowermost position with the assembly 305 out of contact with the assembly 306. This results in any elevated wheels 377 again engaging the tracks and thereafter the control for piston cylinder combination 371 is operated to retract the rectangular plate 365 to a datum position. At this time the coated cloth is removed, the flashing cleared off of the perimetric rails, and thence the tile panel which is of a construction described with reference to FIGURE 10, is removed from the manifold assembly. Advantageously a release agent may be sprayed on the then upward surface of the manifold assembly preparatory to making the next tile panel.

Now the handle 36 is again rotated in the direction of the arrow 338 to clear the notch plate 339 and thence in the direction opposite of arrow 375 to return said manifold assembly to the datum position of FIGURES 21 and 22. The handle is then moved into the notch of plate 339.

Shortly before using the resin it is highly desired that it be degased by being heated while being agitated at about 105° centigrade in a vacuum of about 28 in. of mercury for a period of about one hour. Advantageously the pigment may be added at this time.

In making the tile panels of this invention, it is preferred that the uncured resin have a viscosity in a range of 2000–35000 centipoise as measured by the Brookfield RVF viscometer using a #4 spindle at 20 r.p.m. and 25° centigrade. It is also preferred that the viscosity be closer to the 3500 centipoise end of the range. A suitable resin for the process is one sold under the trademark Urathox HC1775, of Minnesota Mining and Manufacturing. Another suitable resin is a polyesther-polyurethane elastomer sold by Chemical Products Corporation under the trademark Chem-o-thane.

Using the resin Urathox or Chem-o-thane in accordance with this invention, it can be cured in about 3 minutes at 150° C. for the purposes of this invention.

It is preferred that the resilient pad attached to the manifold be about 3/16" thick and have a range of a durometer hardness of 15–25; that for tile pieces about 15/16" sq. the cross sectional area of the unsupported pad be about .35–.50 square inch. (i.e. that the area of the portion of the plate aperture directly above the resilient pad), and the manifold pressure of about 18–24 inches of mercury; and that where the manifold rails are not provided with lands the rails can be about .187 thick for a .217 inch thick tile piece.

As many widely apparent different embodiments of this invention may be made without departing from the spirit and scope thereof, it is to be understood that I do not limit myself to the specific embodiments herein.

What I claim is:

1. In apparatus for making perforated tile panels comprising a continuous conveyor having a pair of endless chains that have generally horizontal upper runs, means mounting said chains in transverse spaced relationship including a driven shaft and a plurality of closely spaced transversely elongated blocks mounted on said chains for movement therewith, each of said blocks having a generally horizontal leg and a rear vertical flange attached thereto of a smaller vertical dimension than the height of a tile piece, adjacent vertical surfaces on adjacent pair of blocks being longitudinally spaced a distance only slightly greater than the length of a tile piece, means for delivering the tile pieces onto the horizontal legs of the blocks on the rearward portion of said upper runs of the chains, elongated longitudinally extending means extended above the block horizontal legs for properly transversely spacing the tile pieces being carried by said blocks and means for driving said driven shaft.

2. The apparatus of claim 1 further characterized in that there is provided a manifold body having a plenum recess therein, and a plate attached to said body to cover said recess, said plate having a plurality of apertures opening above a central portion of the tile pieces when properly spaced on said blocks, an apertured resilient mat having a plurality of similarly spaced apertures attached to the side of said plate opposite said body and means attached to said manifold body for lowering said manifold body to position the resilient mat to abut against the properly spaced tile pieces on the blocks and applying a vacuum to said recess through said apertures so that the tile pieces compress the mat and are affixed thereto, then raise the manifold body together with the tile pieces and next index the manifold body to a location for further treatment, the last mentioned means being synchronized with the shaft drive means.

3. The apparatus of claim 2 further characterized in that there is provided a support member and that the last mentioned means functions to lower the manifold body with picked up tile pieces unto said support member with the tile pieces in spaced relationship with the support member top surface.

4. The apparatus of claim 3 further characterized in that the support member has longitudinally and transverse extending grids in substantially the same spaced relationship as the spacing between the tile pieces carried by the manifold body.

5. Apparatus for making preformed tile panels that include a plurality of spaced tile pieces, a tile mounting board having transverse and longitudinal grids to properly space the tile pieces, a resilient pad having vertical aperture to open above the central portion of each tile piece on said board to overlay the tile pieces on said board, a manifold backing plate to overlay said resilient pad and having an aperture to open to each of said resilient pad apertures, and a manifold body joined to said plate on the opposite side of said plate from said pad, said plate and body cooperatively forming a manifold chamber that opens to each of the plate apertures, and means for applying a vacuum to the manifold chamber whereby the tile pieces are caused to compress said pad to deform portions of the pad into the spaces between the tile pieces.

6. The structure of claim 5 further characterized in that each plate aperture has an enlarged diametric portion opening to the manifold chamber and a reduced diameter portion opening to the adjacent pad aperture and that a manifold spool is mounted in part in said plate and pad apertures, said spool having an enlarged diametric flange in said enlarged diametric aperture portion, a reduced diametric portion extending through said reduced diametric aperture portion and the adjacent pad aperture and a flange underlying an annular pad portion, said spool having a central aperture for applying a vacuum from the manifold chamber to a tile piece.

7. The structure of claim 5 further characterized in that a manifold spool is mounted in each plate aperture for limited axial movement, each spool having an upper and lower flange, extended through a pad aperture with the lower flange underlying the adjacent pad portion for retaining the pad adjacent the manifold plate, and having a central aperture for conducting fluid between the manifold chamber and the area immediately adjacent the respective tile piece and that there is provided means joined to the manifold plate for mounting each spool for limited axial movement relative the plate.

8. The structure of claim 5 further characterized in that there is provided vibratory means for facilitating arraying of tile pieces on said mounting board, said vibratory means including a base for supporting said mounting board and a perimetric frame on said base surrounding said board and extending a substantial distance above said board when it is supported by the base.

9. The structure of claim 5 further characterized in that there is provided an aligning platform for supporting said board and providing a border surface against which the outer most rows of tile pieces on said board can be aligned, said platform including a base for supporting said board, a frame having a central opening of a size and shape to bound the tile pieces when spaced in accordance with the desired spacing in the finished panel and means for mounting said frame in fixed horizontal relation to the base and limited vertical movement between a position with the upper horizontal surface substantial above the general upper surface of the board on the base and a second position substantially lower than the first mentioned position.

10. The structure of claim 5 further characterized in that spacers are provided to surround said pad, rails to depend from the spacers, and means to mount said spacers and rails to the manifold plate to enclose central openings, the pad being located in the spacers center opening, the spacers being of approximately the same height as said pad and the rails being of a substantial smaller height than the tile pieces, said manifold plate having a depending perimetric border member horizontal spaced from said rails and spacers to provide an open channel, said perimetric border member depending to a lower elevation than said rails.

11. The structure of claim 9 further characterized in that said border member comprises a perimetric seal member and that there is provided means to apply a vacuum to said channel.

12. The structure of claim 11 further characterized in that there is provided a support member having planar surface portions, said border member being of a dimension to vertically space the bottom surfaces of the tile pieces and rails above the planar portions when a vacuum is applied to said channel and to said chamber to retain tile pieces adjacent said pad.

13. The structure of claim 11 further characterized in that said support member has upwardly extending grids separating said planar portions, said grids being vertically located between the tile pieces and of a height approximately equal to said spacing between the tile pieces and the planar portions.

14. The structure of claim 11 further characterized in that said support member includes means for applying heat to the top surface portions thereof.

15. Apparatus for making preformed tile panels that include a plurality of spaced tile pieces comprising a tile mounting board having a transverse and longitudinal grids to properly space the tile pieces, a resilient pad having vertical aperture to open above the central portion of each tile piece on said board to overlay the tile pieces on said board, a manifold backing plate having a general planar bottom surface to overlay said resilient pad and having an aperture to open to each of said resilient pad apertures, and a manifold body joined to said plate on the opposite side of said plate from said pad, said plate and body cooperatively forming a manifold chamber that opens to each of the plate apertures, and means for applying a vacuum to the manifold chamber whereby the tile pieces are affixed against said pad to deform portions of the pad into the spaces between the tile pieces, a resin mixture support member having a general planar support surface portion, said support member and manifold having cooperating means forming a peripheral frame surrounding the tile pieces that are held adjacent the resilient pad by a vacuum applied through the manifold chamber and spacing said manifold plate surface portion above said support member surface sufficient to indirectly support the tile pieces in vertical spaced relation to said support member.

16. The structure of claim 15 further characterized in that there is provided means for applying a vacuum within said peripheral frame to withdraw air between the tile pieces and of negative pressure that the vacuum in the manifold chamber retains the tile pieces spaced above the support member.

17. Apparatus for making preformed tile panels that include a plurality of tile pieces and cured resinous joints comprising means for facilitating the arrayment of at least the majority of tile pieces in spaced relationship to provide joint spaces and supporting the arrayed tile pieces in an arrayed condition, a vacuum manifold assembly lowerable onto the arrayed tile pieces for picking up siad tile pieces in the arrayed condition, said assembly including a resilient pad and means for appling suction through said pad to the tile pieces for affixing to said tile pieces on said arrayng means and releasably retaining said tile pieces in the said relative relationship as arrayed, and means for supportingly retaining an uncured resinous mixture and supporting said manifold assembly in a lowered condition, said manifold assembly and uncured resinous support means having cooperating means forming an enclosed chamber in which the tile pieces are located when affixed to said resilient pad and the manifold assembly is lowered onto said resinous support means, and means connected to said cooperating means for selectively withdrawing air from said chamber and thereby cause uncured resinous mixture on said support member to flow into the joint spaces between the tile pieces.

18. The structure of claim 17 further characterized in that said arraying means includes an endless conveyor having transversely elongated spacers for longitudinally spacing and supportingly conveying tile pieces and means cooperating with said conveyor for transversely spacing said tile pieces.

19. The structure of claim 17 further characterized in that said arraying means include a tile mounting board having cross intersecting grids other than at the perimetric edges thereof and that there is provided an alignment platform for aligning the outer most rows of tile pieces before said tile pieces are affixed to said manifold assembly, said alignment platform including a base for supporting said board, frame means enclosing a central opening and having inner vertical surfaces against which the outer most rows of tile pieces on said board can be moved against to properly position the tile pieces in the outer most rows and an upper horizontal surface, and means connected to said base for mounting said frame means for limited vertical movement between an upper position where said horizontal surface is located at an elevation above the lower surfaces of the tile pieces on said board and a lower position.

20. The structure of claim 19 further characterized in that said frame mounting means includes means for resiliently urging said frame means to said upper position and that said manifold assembly includes frame means surrounding said resilient pad for depressing said alignment frame means when the manifold assembly is lowered unto said alignment platform, said manifold assembly frame means extending to a substantially lower elevation than said pad.

21. The structure of claim 20 further characterized in that said manifold assembly and alignment platform having cooperating guide means for horizontally aligning one to the other as the manifold assembly is lowered unto said platform and that said manifold assembly frame means in a lowered condition has inner vertical surfaces that are spaced about one-half joint dimension from the respective outer most row of tile pieces that had abutted against said platform frame means.

22. The structure of claim 17 further characterized in that said arraying means includes a horizontally vibratory base, a gridded tile mounting board removeably positionable on said vibratory base and a frame on said base to closely bound said board and extend above tile pieces deposited on said board.

23. The structure of claim 22 further characterized in that said manifold assembly includes a frame surrounding said resilient pad and extending to a lower elevation than the tile pieces affixed to said pad, said frame having fixed depending lands with lower surfaces that abut said resinous supporting means to limit the lowering of the assembly relative thereto and provide vents opening to the voids between the tile pieces.

24. The structure of claim 23 further characterized in that the manifold cooperating means includes a depending resilient perimetric seal that in a relaxed condition extends to a substantially lower elevation than said manifold frame and surrounds said frame to in cooperation therewith form a perimetric channel that opens to said vents and means for applying a vacuum to said channel.

25. The structure of claim 23 further characterized in that said lands limits the downwardly movement of said assembly on the resinous support means to an amount that the tile pieces affixed to the resilient pad are vertically spaced from the last mentioned means.

26. The structure of claim 23 further characterized in that there is provided a pattern board seatable on the resinous support means having a cut out of an appropriate shape to have the resired quantity of uncured resinous mixture deposited therein and to provide for the flow of uncured resinous mixture to spread over the entire surface of said resinous support means when the manifold assembly has been lowered thereon and a vacuum has been applied through said cooperating means.

27. Apparatus for making preformed tile panels that include a plurality of spaced tile pieces, a tile mounting board having transverse and longitudinal grids for properly spacing tile pieces, a manifold assembly including a resilient pad having vertical apertures to open above the central portion of each tile piece on said board when located to overlie the tile pieces on said board, a manifold plate to overlie said resilient pad and having an aperture opening to each of the resilient pad apertures, and a manifold body joined to said plate on the opposite side of said plate from said pad, said plate and body cooperatively forming a manifold chamber that opens to each of the plate apertures, a longitudinally elongated frame, operable means for supportingly mounting the manifold assembly on the frame for rotational movement about a horizontal axis, and translating it relative to the frame between a lowered and an elevated position relative to the frame, an alignment assembly mounted on the frame for movement between a position underlying the manifold assembly when the last mentioned assembly is in an elevated condition and a lowered condition abutting against said alignment assembly, and a retracted condition spaced from the manifold assembly sufficiently so that the manifold assembly may be rotated and translated, means connected to the frame and the alignment assembly for moving it between the two aforementioned positions, said alignment assembly having means for receiving the tile mounting board and against which the outer rows of the tile pieces on the tile mounting board may be aligned and a heated platen mounted for movement on the frame between a condition overlaying the manifold assembly in a lowered position and a retracted condition spaced from the manifold assembly, and means for selectively moving the alignment assembly between its positions, said manifold assembly having means for forming a perimetric channel including a peripheral seal for selectively abutting against the alignment frame and the heated platen, and means for selectively applying a vacuum to the manifold chamber and thence through the resilient pad to the tile pieces to affix the tile pieces to said pad and to the perimetric channel when said peripheral seal abuts against the heated platen whereby air may be withdrawn from the voids between the tile pieces that are fixed to the resilient pad.

28. The apparatus of claim 27 further characterized in that said supportingly mounting means include oppositely extending tubular members that are generally centrally located with reference to the longitudinal length of the frame, and that the operable means includes a piston cylinder combination mounted by the frame directly beneath the tubular members, means connected to the piston cylinder combination to be elevated thereby for rotatably supporting said tubular members and means connected to one of said tubular members for selectively rotating said tubular member through an angle of 180° and locking the tubular members in its position after they have been rotated through an angle of 180°.

29. Apparatus for making preformed tile panels that includes a plurality of spaced tile pieces comprising a longitudinally elongated frame, an alignment assembly having a base plate, means mounted on the base plate for supporting tile pieces in an aligned condition and to facilitate the alignment of the outer rows of tile pieces, said base plate having a horizontal cross sectional area substantially larger than that enclosed by said elongated frame, a manifold assembly including a resilient pad having apertures to open above the central portion of each tile piece on said alignment means to overlie the tile pieces on said alignment means, means for mounting said resilient pad including means for selectively applying a vacuum through each of said apertures, means cooperating with the resilient pad mounting means for forming a perimetric channel surrounding said resilient pad and spaced therefrom, a heated platen, means mounting said manifold assembly for transitorily movement and movement through at least an angle of 180° about a horizontal axis relative to the frame, means on the frame for mounting and moving the alignment assembly relative to the manifold assembly between a position wherein the alignment frame assembly is spaced from the maniwherein th ealignment frame assembly is spaced from the manifold assembly and in a position that the alignment bly is directly beneath the manifold assembly, and means on the frame for mounting and moving the heated platen assembly between a position spaced from the manifold assembly and a position overlying the manifold assembly, and means for selectively applying a vacuum to said perimetric channel whereby when said perimetric channel means abuts against said platen assembly and a vacuum has previously been applied through said pad to affix tile pieces thereto in spaced relation air is withdrawn from the voids between the tile pieces.

30. Apparatus for making preformed tile panels that includes a plurality of spaced tile pieces and a cured resin mixture, a tile mounting board having transverse and longitudinal grids to properly space the tile pieces, a longitudinally elongated frame, an alignment frame assembly having a base plate, an open alignment frame on said base plate for receiving therein the tile mounting board with the tile pieces therein, said base plate having portions extending horizontally outwardly of said alignment frame from all sides thereof, a manifold assembly including a manifold member having a manifold chamber, an apertured resilient pad on said member that in cross section is of about the same size and shape as said tile mounting board, a perimetric pad frame on said manifold member surrounding said pad, extending away from said member a greater distance than said pad and enclosing an opening slightly larger than that bounded by the alignment frame, said manifold member having apertures placing the manifold chamber in fluid communication with the pad apertures, a perimetric seal member joined to said manifold member and in cooperation with said manifold member and said pad frame bounding a U-shaped perimetric channel surrounding said pad frame, said seal member extending away from the manifold member a greater distance than said pad frame, a heated platen having a surface area at least as large as that of said seal member, means for selectively applying a vacuum to the manifold chamber and to the perimetric channel and means on the frame for moving the manifold subassembly relative the alignment frame assembly to position the perimetric seal member in abutting fluid sealing relationship with said base plate portions with a pad aperture directly overlying a tile piece on the board within the alignment frame whereupon application of vacuum to the manifold chamber will affix the tile pieces to the resilient pad, thence moving the manifold assembly relative to the alignment frame assembly to be spaced therefrom and the manifold assembly relative the platen to a position the seal member forms a fluid seal with said platen surface.

31. The apparatus of claim 30 further characterized in that the last mentioned means includes means for reciprocating the platen relative the manifold assembly between a horizontally spaced apart position and a position the platen overlays the manifold assembly and means for reciprocating the alignment frame assembly relative the manifold assembly between a horizontally spaced apart position and a position the manifold assembly overlays the alignment frame assembly and rotating the manifold assembly about a horizontal axis so the seal member is alternately positioned to engage the said base plate portions and said platen surface.

32. Apparatus for making preformed tile panels that include a plurality of spaced tile pieces having finished surfaces and a cured resin mounting said tile pieces in spaced relationship comprising a frame, means movable on the frame for aligning and supporting individual tile pieces in predetermined spaced relationship with their finished surfaces up, means mounted on the frame for reciprocating said aligning and supporting means between a datum tile receiving position and a tile pick up position, means for affixing to the tile pieces at their finish surfaces and form a fluid seal with said finished surfaces while the tile pieces are on said aligning and supporting means in the title pick up position, means for moving tile piece affixing means between a datum lowered position, an elevated position at an elevation above the aligning and supporting means in a tile pick up position, and a rotated position with the tile pieces affixed and facing up, a heat platen, and means on the frame for reciprocating said platen between a datum position and a position overlaying the affixing means in said rotated position, said heated platen and tile affixing means having cooperating means for causing uncured resin applied to surfaces of the tile pieces opposite said finished surfaces to fill the joint spaces between the tile pieces.

33. Apparatus for making a preformed tile panel that includes a plurality of spaced tile pieces having finished surfaces and a cured resin comprising an elongated frame, means on said frame for receivably supporting and retaining individual tile pieces in predetermined spaced relationship with their finished surfaces up, manifold means on the frame for affixing to the tile pieces at their finished surfaces and form a fluid seal with said finished surfaces, a heated platen on the frame and means on the frame mounting and selectively operating the supporting means relative to the manifold means to a position that the manifold means can pick up tile pieces from the supporting means, then the manifold means to a position with the tile pieces facing upwardly, and the platen relative the manifold means to overlay the manifold means with the tile pieces facing upwardly, said platen and manifold means having cooperating means for causing uncured resin apply to upward surfaces of the tile pieces to fill the point spaces between the tile pieces, said manifold means including a manifold assembly and control means for selectively operating said manifold assembly to pick up tile pieces and release tile pieces and means for rotating the manifold assembly about a horizontal axis between a position to pick up the tile pieces and a position that the tile pieces face upwardly.

34. Apparatus for making preformed tile panels that include a plurality of spaced tile pieces comprising a tile mounting board having transverse and longitudinal grids to properly space the tile pieces, a manifold including a resilient pad having vertical aperture to open above the central portion of each tile piece on said board to overlay the tile pieces on said board and of about 15–25 durometer hardness, a manifold backing plate having a general planar bottom surface to overlay said resilient pad and having an aperture to open to each of said resilient pad apertures, each plate aperture having a cross sectional area of about .35–.50 square inch adjacent the pad, a manifold spool having an aperture slideably retained in each plate aperture and extended through the corresponding pad aperture for supporting the pad from the plate, and a manifold body joined to said plate on the opposite side of said plate from said pad, said plate and body cooperatively forming a manifold chamber that opens to each of the plate apertures, means for applying a vacuum to the manifold chamber of about 18–24 inches of mercury whereby the tile pieces are affixed against said pad to deform portions of the pad into the spaces between the tile pieces, a heated platen having a general planar surface portion, said platen and manifold having cooperating means forming a peripheral fluid sealing frame surrounding the tile pieces that are held adjacent the resilient pad by a vacuum applied through the manifold chamber and spacing said manifold plate surface portion from platen surface sufficient to indirectly support the tile pieces in vertical spaced relation to said platen surface portion, and means for applying a vacuum in the neighborhood of 12–13 inches of mercury within said sealing frame when the manifold and platen are adjacent one another to withdraw air from between the tile pieces held on said resilient pad.

35. Apparatus for making preformed tile panels that include a plurality of spaced tile pieces, a tile mounting board having transverse and longitudinal grids to properly space the tile pieces, a resilient pad having vertical aperture to open above the central portion of each tile piece on said board to overlay the tile pieces on said board, a manifold backing plate to overlay said resilient pad and having an aperture to open to each of said resilient pad apertures, and a manifold body joined to said plate on the opposite side of said plate from said pad, said plate and body cooperatively forming a manifold chamber that opens to each of the plate apertures, means for applying a vacuum to the manifold chamber whereby the tile pieces are caused to compress said pad to deform portions of the pad into the spaces between the tile pieces, a frame, a heated platen on said frame, an alignment assembly for receivingly supporting said tile mounting board means on the frame mounting the resilient pad, manifold plate and manifold body for movement about a horizontal axis, and means for moving the last mentioned means, the platen and the alignment assembly selectively between relative positions that the resilient pad is closely adjacent tile pieces on the alignment assembly so that the tile pieces will be affixed to said pad when a vacuum is applied to the manifold chamber, and the after rotation of said plate and manifold body to position the affixed tile pieces beneath the heated platen and closely adjacent thereto.

References Cited

UNITED STATES PATENTS

| | | | |
|---|---|---|---|
| 3,118,808 | 1/1964 | Marchioli et al. | 25—43 X |
| 3,122,812 | 3/1964 | Gory | 25—43 |
| 3,192,567 | 7/1965 | Abernethy et al. | |
| 3,193,903 | 7/1965 | White. | |
| 3,322,591 | 5/1967 | Cleverly. | |

WILBUR L. McBAY, Primary Examiner

U.S. Cl. X.R.

25—1, 43, 142

PO-1050
(5/69)

UNITED STATES PATENT OFFICE
CERTIFICATE OF CORRECTION

Patent No. 3,490,096      Dated January 20, 1970

Inventor(s) Russell W. Johnson

It is certified that error appears in the above-identified patent and that said Letters Patent are hereby corrected as shown below:

Column 1, line 49, "corss" should be --cross--. Column 3, line 68, "virtial" should be --vertical--. Column 6, line 21, "manifod" should be --manifold--; line 64, after "to" insert --at--. Column 10, line 8, "portion" should be --portions--. Column 11, line 5, "respectievly" should be --respectively--; line 50, "uper" should be --upper--. Column 12, line 14, "butting" should be --abutting--. Column 13, line 51, after "advantageously" insert --may--. Column 14, line 32, "jointly" should be --joint--. Column 15, line 33, "manifonld" should be --manifold--; line 44, "manifonld" should be --manifold--. Column 16, line 51, "froward" should be --forward--. Column 17, line 56, "voilds" should be --voids--. Column 20, line 39, "rectngular" should be --rectangular--. Column 27, line 60, "resired" should be --desired--. Column 28, line 71, delete "mani-"; delete line 72; line 74, before "bly" insert --assem--. Column 29, line 72, "title" should be --tile--. Column 30, line 28, "point" should be --joint--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents